US012716772B2

(12) United States Patent
Wu et al.

(10) Patent No.: US 12,716,772 B2
(45) Date of Patent: Aug. 25, 2026

(54) QUANTUM DOTS/GRAPHENE HETEROSTRUCTURES FOR HIGH-PERFORMANCE UNCOOLED INFRARED DETECTION

(71) Applicant: University of Kansas, Lawrence, KS (US)

(72) Inventors: Judy Z. Wu, Lawrence, KS (US); Maogang Gong, Lawrence, KS (US); Bo Liu, Lawrence, KS (US); Andrew Shultz, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 207 days.

(21) Appl. No.: 18/589,836

(22) Filed: Feb. 28, 2024

(65) Prior Publication Data

US 2024/0298521 A1 Sep. 5, 2024

Related U.S. Application Data

(60) Provisional application No. 63/487,653, filed on Mar. 1, 2023.

(51) Int. Cl.
*C01B 19/00* (2006.01)
*B82Y 20/00* (2011.01)
*B82Y 40/00* (2011.01)
*G01J 1/42* (2006.01)

(52) U.S. Cl.
CPC .............. *G01J 1/42* (2013.01); *C01B 19/007* (2013.01); *B82Y 20/00* (2013.01); *B82Y 40/00* (2013.01); *C01P 2002/77* (2013.01); *C01P 2002/82* (2013.01); *C01P 2004/04* (2013.01); *C01P 2004/32* (2013.01); *C01P 2004/64* (2013.01); *C01P 2006/40* (2013.01)

(58) Field of Classification Search
CPC .... B82Y 40/00; C01B 19/007; C01P 2004/64
See application file for complete search history.

(56) References Cited

U.S. PATENT DOCUMENTS

2005/0022726 A1* 2/2005 Wong ..................... B82Y 40/00
117/105

OTHER PUBLICATIONS

Tang Xin., et al., Thermal Imaging with Plasmon Resonance Enhanced HgTe Colloidal Quantum Dot Photovoltaic Devices, *ACS Appl. Nano Mater*. XXXX, XXX, XXX-XXXX; Supporting Information; pp. A-I. (Jul. 2018). DOI: 10.1021/acsnano.8b03871.
Matthias J. Grotevent et al., "Colloidal HgTe Quantum Dot/Graphene Phototransistor with a Spectral Sensitivity Beyond 3 μm," *Adv. Sci.* 2021, 8, 2003360; pp. 1 of 7).
(Continued)

*Primary Examiner* — Daniel P Shook
(74) *Attorney, Agent, or Firm* — Bell & Manning, LLC

(57) ABSTRACT

Provided are methods of fabricating photodetectors based on heterostructures comprising graphene and mercury chalcogenide, e.g., HgTe, quantum dots. Embodiments of the methods are able to provide photodetectors that can detect MWIR light, e.g., greater than 3 mm at room temperature with responsivities R* of at least $10^4$ A/W and detectivities D* of at least $10^{11}$ Jones. Thus, the present photodetectors outperform existing MWIR photodetectors without the need for cooling. The photodetectors themselves are also encompassed.

13 Claims, 20 Drawing Sheets

(56) References Cited

OTHER PUBLICATIONS

Sean Keuleyan et al., “Mid-infrared HgTe colloidal quantum dot photodetectors,” *Nature Photonics*, vol. 5, Aug. 2011; pp. 489-493.
Matthias J. Grotevent, Doctoral Thesis—“Nanoprinted Quantum DOT/Graphene Infrared Photodetectors, and their Temperature-Dependent Mechanism of Charge Carrier Transfer,” (2020); pp. 1-112. https://doi.org/10.3929/ethz-b-000466333.
Judy Z. Wu et al., “Nanohybrid Photodetectors,” *Adv. Photonics Res.*, 2021, 2100015; pp. 1 of 19.
Maogang Gong et al., “High-Performance All-Inorganic CsPbCl3 Perovskite Nanocrystal Photodetectors with Superior Stability,” *ACS Nano* 2019, 13; pp. 1772-1783.
Judy Wu et al., “Quantum dots/graphene nanohybrids photodetectors: progress and perspective,” *Nano Express* 2 (2021), 031002; pp. 1-7.
Huo N., et al., MoS2—HgTe Quantum Dot Hybrid Photodetectors beyond 2 μm, *Adv. Mater*. 29, 1606576 (2017).
Tang X., et al., Dual-band infrared imaging using stacked colloidal quantum dot photodiodes*Nat. Photonics* 13, 277-282 (2019).
Noumbe U. N., et al., Reconfigurable 2D/0D p-n Graphene/HgTe Nanocrystal Heterostructure for Infrared Detection, *ACS Nano* 14, 4567-4576 (2020).
Gréboval C., et al., Gate tunable vertical geometry phototransistor based on infrared HgTe nanocrystals, *Appl. Phys. Lett.* 117, 251104 (2020).
Gréboval C., et al., Split-Gate Photodiode Based on Graphene/HgTe Heterostructures with a Few Nanosecond Photoresponse, *ACS Appl. Electron. Mater*. 3, 4681-4688 (2021).
Ackerman M. M., et al., Fast and Sensitive Colloidal Quantum Dot Mid-Wave Infrared Photodetectors, *ACS Nano* 2018, 12, 7264-7271.
Chu A., et al., Infrared photoconduction at the diffusion length limit in HgTe nanocrystal arrays, *Nat. Commun*. 12, 1794 (2021).
Lan X., et al., Quantum dot solids showing state-resolved band-like transport, *Nat. Mater*. 19, 323-329 (2020).
Tang X., et al., Graphene/HgTe Quantum-Dot Photodetectors with Gate-Tunable Infrared Response, *ACS Appl. Nano Mater*. 2, 6701-6706 (2019).

* cited by examiner

HgTe QDs
Hg
Te

HgTe (Cl) QDs

HgTe core/shell QDs 1 nm
[011]
Te
240 pm
Hg
280 pm

[100]
Hg
300 pm
Hg
287 pm
Hg
280 pm
Hg
320 pm 2 nm
Te
240
Hg
300 pm graphene ΔR/R0=0
graphene ΔR/R0=2.8 Ω
D
G
2D
Intensity (a.u.)
Raman Shift (cm-1)
1000
1500
2000
2500
3000

ΔR/R0=0 Ω
0.2217 a.u.
0.09808 a.u.
ΔR/R0=2.8 Ω
0.5063 a.u.
0.319 a.u.
ΔR/R0=0
ΔR/R0=2.8 Ω
Counts (a.u.)
0
500
1000
D/G Ratio (a.u.)
0.0
0.1
0.2
0.3
0.4
0.5
0.6
0.7

Ligands-exchange

OLA, TOP, DDT
OLA, TOP, DDT and MPA
MPA

QUANTUM DOTS/GRAPHENE HETEROSTRUCTURES FOR HIGH-PERFORMANCE UNCOOLED INFRARED DETECTION

CROSS REFERENCE TO RELATED APPLICATIONS

The present application claims priority to U.S. provisional patent application No. 63/487,653 that was filed Mar. 1, 2023, the entire contents of which are incorporated herein by reference.

REFERENCE TO GOVERNMENT RIGHTS

This invention was made with government support under W909MY-21-C-0033 awarded by Army Research Office. The government has certain rights in the invention.

BACKGROUND

Infrared (IR) detection has been extensively investigated since the discovery of IR radiation a century ago and has been widely used in both commercial and military applications. For IR detectors, semiconductors with bandgaps ($E_g$) in the IR spectrum, such as HgCdTe, InSb, InGaAs, have been used. For the short to middle wavelength IR (SWIR-MWIR) spectra, $E_g$ values are generally sub-eVs or lower. Cryogenic cooling to minimize thermal noise is required since specific detectivity (D*) is inversely proportional to the noise-equivalent power (NEP). Some cooled II-VI and III-V IR detectors and focal plane arrays (FPAs) have shown D* of up to $10^{10}$ to $10^{12}$ Jones in MWIR. Without cooling, the state-of-the-art IR photodetectors (such as InGaAs or related III-V semiconductors) have D* ~$10^{12}$ Jones at ~1.7 μm wavelength below the optical cutoff, which has been extended to ~2.3 μm for Type II superlattice heterojunction phototransistors made using molecular beam epitaxy. However, at longer wavelengths, the D* drops by orders of magnitude due to increasing thermal noise.

SUMMARY

Provided are methods of fabricating photodetectors based on heterostructures comprising graphene and mercury chalcogenide, e.g., HgTe, quantum dots. Embodiments of the methods are able to provide photodetectors that can detect MWIR light, e.g., greater than 2 or 3 mm at room temperature with responsivities (R*) of at least $10^4$ A/W and detectivities (D*) of at least $10^{11}$ Jones. Thus, the present photodetectors outperform existing MWIR photodetectors without the need for cooling. The photodetectors themselves are also encompassed.

In one aspect, methods of fabricating photodetectors are provided. In an embodiment, such a method comprises combining a mercury acetate precursor with a chalcogen precursor in a solution comprising stabilizing ligands under conditions to form mercury chalcogenide quantum dots; depositing the mercury chalcogenide quantum dots on a surface of graphene; and exchanging stabilizing ligands on surfaces of the mercury chalcogenide quantum dots with 3-mercaptopropionic acid.

In another aspect, photodetectors are provided. In an embodiment, such a photodetector comprises a graphene surface, a layer of mercury chalcogenide quantum dots forming an interface with the graphene surface, 3-mercaptopropionic acid ligands bound to external surfaces of the mercury chalcogenide quantum dots, and a pair of electrodes in electrical communication with the graphene surface.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

(FIG. 1A) Low-resolution TEM image of the HgTe QDs. The inset shows the QD size statistics with an average of ~3.9 nm obtained by analyzing ~500 QDs. QD clusters are visible as highlighted. (FIGS. 1B-1C) HRTEM images of the HgTe QDs. (FIG. 1D) Zoom-in view of a single HgTe QD in (FIG. 1C). The extracted lattice distance of 0.47 nm is associated with the (110) surface plane of zincblende for the HgTe QDs. (FIG. 1E) Electron diffraction pattern taken on the HgTe QDs. (FIGS. 1F-1G) Schematics of the HgTe crystal structure. (FIG. 1H) EDX elemental maps of Hg and Te elements with similar intensity throughout the HgTe QDs.

(FIG. 3A) Noise current density spectra of graphene measured under different $V_{sd}$ values in the range of 0.1-0.4 V. The inset shows the noise magnitude at 100 Hz under different $V_{sd}$ values which is extracted from the 1/f fitting of each noise spectrum curve (line). (FIG. 3B) Comparison of noise current density spectra of graphene only, graphene with first layer of the HgTe QDs, after the first MPA ligand-exchange, and after deposition of the second layer of the HgTe QDs followed with the second MPA ligand-exchange. A $V_{sd}$ of 0.4 V was applied to all curves. (FIG. 3C) Noise current density spectra of HgTe QDs/Gr nanohybrid devices measured under different $V_{sd}$ values. The inset shows the noise magnitude at 100 Hz under different bias voltages which is extracted from 1/f fitting of each noise spectrum curve (line). (FIG. 3D) Comparison of the noise current density of a HgTe QDs/Gr nanohybrid device measured with light off and on under a white LED flashlight with an intensity of 23 $mW/cm^2$ at $V_{sd}$=0.4 V.

5C shows an optical image of a GFET chip of 36 GFETs (left) with four different graphene channel lengths of 2, 5, 10 and 20 μm as labeled on the chip and a specific GFET on the chip with a channel length and width of 6.0 m and 12.8 m, respectively (right).

DETAILED DESCRIPTION

Figures 1A, 1B:
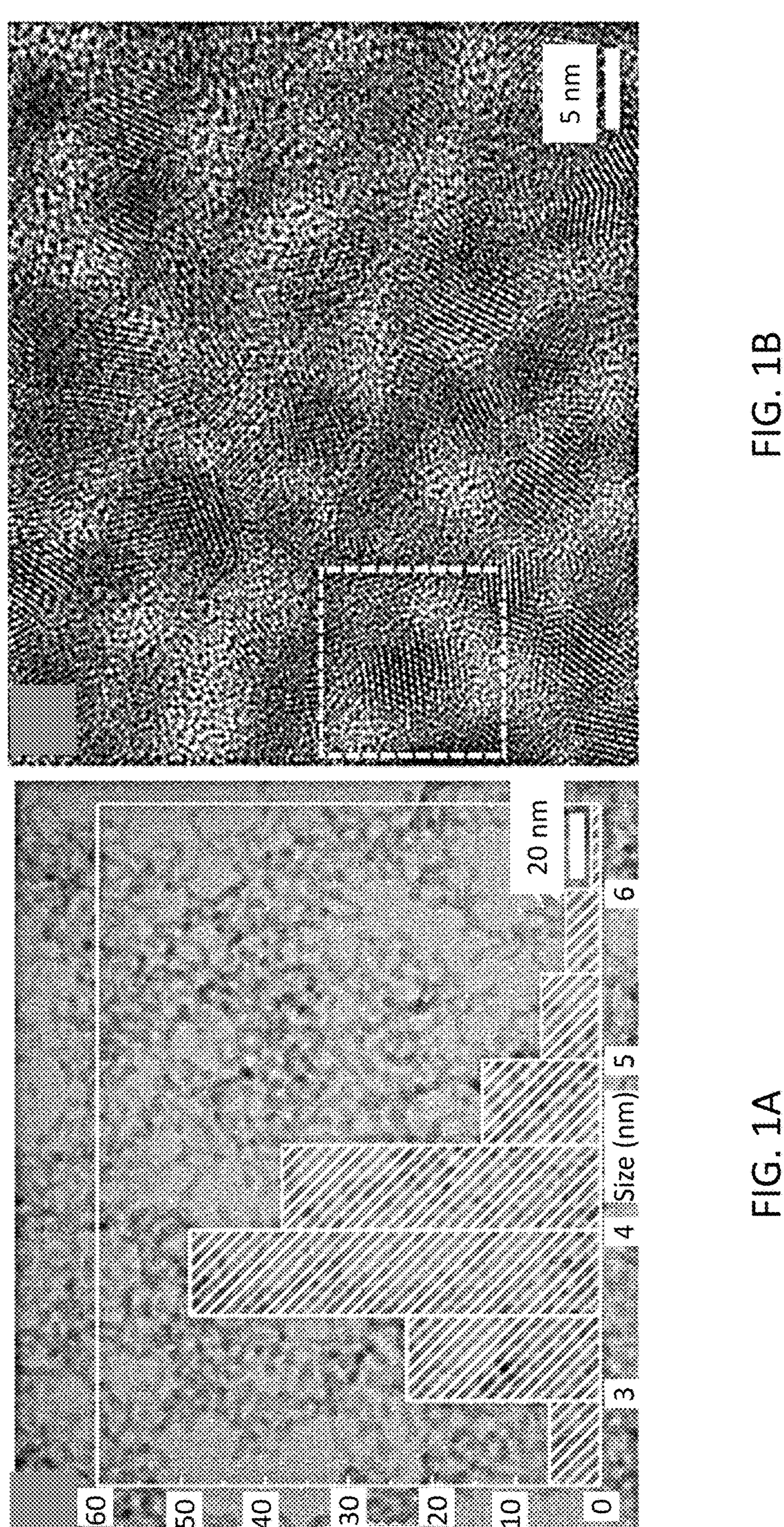
FIGS. 1A-1H: Morphology and crystal structure analysis of HgTe QDs synthesized using a mercury acetate precursor.

Provided are methods of fabricating photodetectors based on heterostructures comprising graphene and mercury chalcogenide quantum dots. In embodiments, such a method comprises synthesizing quantum dots by combining a mercury acetate ($Hg(O_2CCH_3)_2$) precursor with a chalcogen precursor in a solution comprising or consisting of stabilizing ligands under conditions to form mercury chalcogenide quantum dots; depositing the mercury chalcogenide quantum dots on a surface of graphene; and exchanging stabilizing ligands on surfaces of the mercury chalcogenide quantum dots with 3-mercaptopropionic acid (MPA). Each of these steps is described in greater detail below.

As noted above, the present methods comprise synthesizing the mercury chalcogenide quantum dots of the photodetectors. The synthesis comprises combining the mercury acetate precursor with the chalcogen precursor in the solution comprising stabilizing ligands. As further described in the Example, below, this step is based on findings that use of mercury acetate (as opposed to other mercury containing precursors such as $HgCl_2$) is believed to contribute to the superior properties of the photodetectors, e.g., high responsivity and detectivity at room temperature (i.e., no cooling is required). In order to incorporate other metals (e.g., Cd) into the mercury chalcogenide quantum dots, another metal precursor may be included in the solution. However, in embodiments, no other metal precursor is used except for the mercury acetate precursor.

The chalcogen precursor is a material comprising or consisting of a chalcogen (e.g., O, S, Se, or Te). In embodiments, the chalcogen is Te. The term "material" encompasses chalcogens in their elemental form (e.g., Te powder) as well as compounds comprising the chalcogen. A single type or multiple different types of chalcogen precursors may be used. However, in embodiments, a single type of chalcogen precursor is used.

The stabilizing ligands are compounds that are capable of binding to the surfaces of the mercury chalcogen quantum dots, e.g., via covalent or non-covalent bonds. The strength of these bonds may be relatively weak. The stabilizing ligands include compounds that are present during the synthesis of the quantum dots, but also may include compounds added during purification or storage of the quantum dots. The stabilizing ligands generally comprise a long hydrocarbon chain and a moiety capable of forming the covalent/non-covalent bond to the quantum dot surfaces. Suitable stabilizing ligands include fatty acids, fatty amines, fatty phosphines, fatty thiols, and combinations thereof. In embodiments, the stabilizing ligands comprise or consist of oleylamine (OLA), trioctylphosphine (TOP), dodecanethiol (DDT), or combinations thereof. As further described in the Example, below, it is believed that these stabilizing ligands, particularly OLA, are particularly useful for the following reasons. First, they assist in the colloidal suspension of the quantum dots. Second, they protect the quantum dots against degradation under ambient conditions. Third, as demonstrated by the noise reduction and Dirac point shift described in the Example, below, it appears that OLA stabilizing ligands positioned on the quantum dots at the interface formed between the quantum dots and the graphene surface readily detach from the quantum dots as the quantum dots are deposited onto the graphene surface. (See FIG. 9E.) Finally, after such deposition, remaining OLA stabilizing ligands on the quantum dots readily exchange with MPA. (See FIG. 9F.) These features are further believed to contribute to the superior properties of the present photodetectors.

The synthesis conditions refer to parameters such as reaction time, reaction temperature, and the use of fast injection to combine the precursors. Illustrative such conditions are provided in the Example, below. Various molar ratios of the mercury acetate precursor and the chalcogen precursor may be used, including to tune the composition and thus, the bandgap energy ($E_g$) of the mercury chalcogenide quantum dots. Illustrative molar ratios are provided in the Example, below.

In embodiments, the solution in which the mercury chalcogenide quantum dots are synthesized consists of the mercury acetate, an optional metal precursor(s), the chalcogen precursor(s), and the stabilizing ligands.

In embodiments, the synthesis of the mercury chalcogenide quantum dots is carried out to provide the quantum dots as core-shell quantum dots. Such embodiments comprise combining a first mercury precursor with a chalcogen precursor in a solution comprising stabilizing ligands under conditions to form mercury chalcogenide core particles and adding a mercury acetate precursor to the solution under conditions to form a mercury chalcogenide shell layer over each mercury chalcogenide core particle to provide core-shell mercury chalcogenide quantum dots. In the core particle formation step, the first mercury precursor is not mercury acetate, but rather a different mercury precursor, e.g., a mercury halide such as $HgCl_2$. Otherwise, any of the disclosed chalcogen precursors and stabilizing ligands may be used. The synthesis conditions include any of those disclosed herein.

The composition of the mercury chalcogenide quantum dots depends upon the precursors used during the synthesis, as well as whether or not the quantum dots are formed as core-shell quantum dots. Nevertheless, this composition is in the form of a solid, crystalline material comprising or consisting of mercury, optional other metals, and the chalcogen(s) (e.g., Te). In embodiments, the quantum dots comprise or consist of HgTe. Various molar ratios of Hg:Te may be used as described above. If the quantum dots are core-shell quantum dots, the composition of the core and the shell may be the same or different. This includes the core and the shell having the same or different molar ratios of the elements contained therein, e.g., different Hg:Te molar ratios.

Each of the three dimensions of the mercury chalcogenide quantum dots are nanoscale so as to facilitate quantum confinement, e.g., 100 nm or less, 50 nm or less, 25 nm or less, 10 nm or less, 5 nm or less, or in a range of from 1 nm to 25 nm, from 1 nm to 15 nm, or from 1 nm to 10 nm. Core-shell quantum dots are generally larger than non-core-shell quantum dots. For example, non-core-shell quantum dots may have a size (e.g., diameter or width) of from 2 nm to 8 nm. Core-shell quantum dots may have an overall size of from 5 nm to 20 nm, from 8 nm to 18 nm, or from 10 nm to 16 nm. Various shell layer thickness may be used as desired, e.g., from 0.2 nm to 8 nm or from 1 nm to 5 nm. As described in the Example, below, dimensions may be measured from TEM images and values above may be average values as determined from a representative number of quantum dots.

Figures 6A, 6B, 6C, 6D, 6E, 6F:
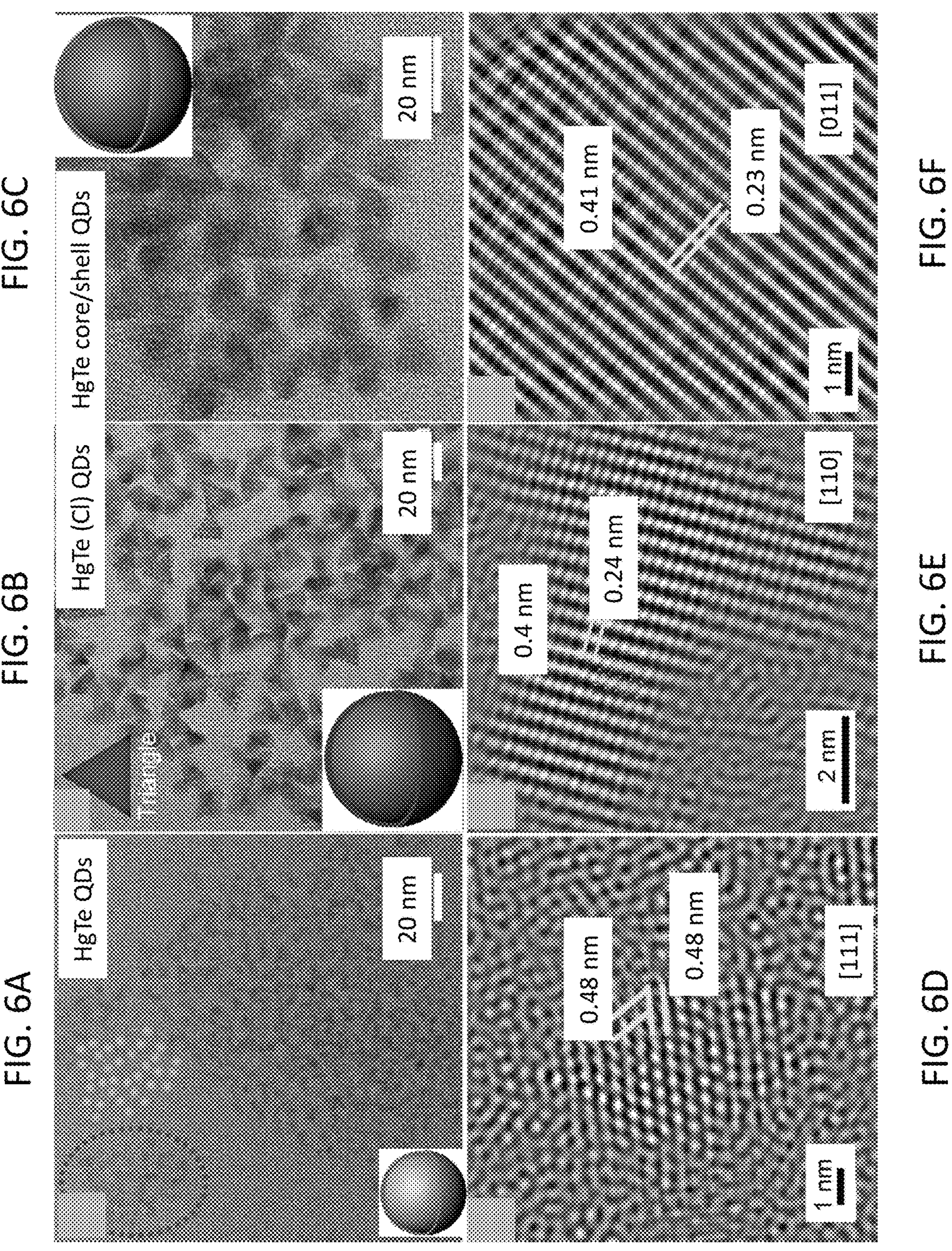
FIGS. 6A-6C show TEM images and schematics of (FIG. 6A) HgTe QDs (synthesized using mercury acetate precursor), (FIG. 6B) HgTe (Cl) QDs (synthesized using $HgCl_2$ precursor), and (FIG. 6C) core/shell HgTe QDs (core synthesized using $HgCl_2$ precursor and shell synthesized using mercury acetate precursor).
FIGS. 6D-6F show the corresponding HRTEM images.

The mercury chalcogenide quantum dots synthesized as described above may be characterized by their shapes. As described in the Example below, it has been found that quantum dots synthesized using a mercury acetate precursor have spherical shapes as distinct from faceted shapes, e.g., triangular, pyramidal, tetrahedral. Specifically, FIG. 6A shows spherical quantum dots synthesized using a mercury acetate precursor. This is in contrast to FIG. 6B showing triangular quantum dots synthesized using a $HgCl_2$ precursor. FIG. 6C further demonstrates that core-shell quantum dots, for which the shell is synthesized using a mercury acetate precursor, can also result in spherical quantum dots. The spherical morphology is believed to be due to the different growth mechanism accessible for quantum dots synthesized using the mercury acetate precursor (see FIG. 7A) as compared to the growth mechanism for quantum dots synthesized using the $HgCl_2$ precursor (see FIG. 7D). Moreover, as further described in the Example below, it is believed that the different growth mechanism is related to superior properties of the present photodetectors. The spherical morphology may be confirmed from TEM images.

Figures 7A, 7B, 7C, 7D, 7E, 7F, 7G, 7H, 7I:
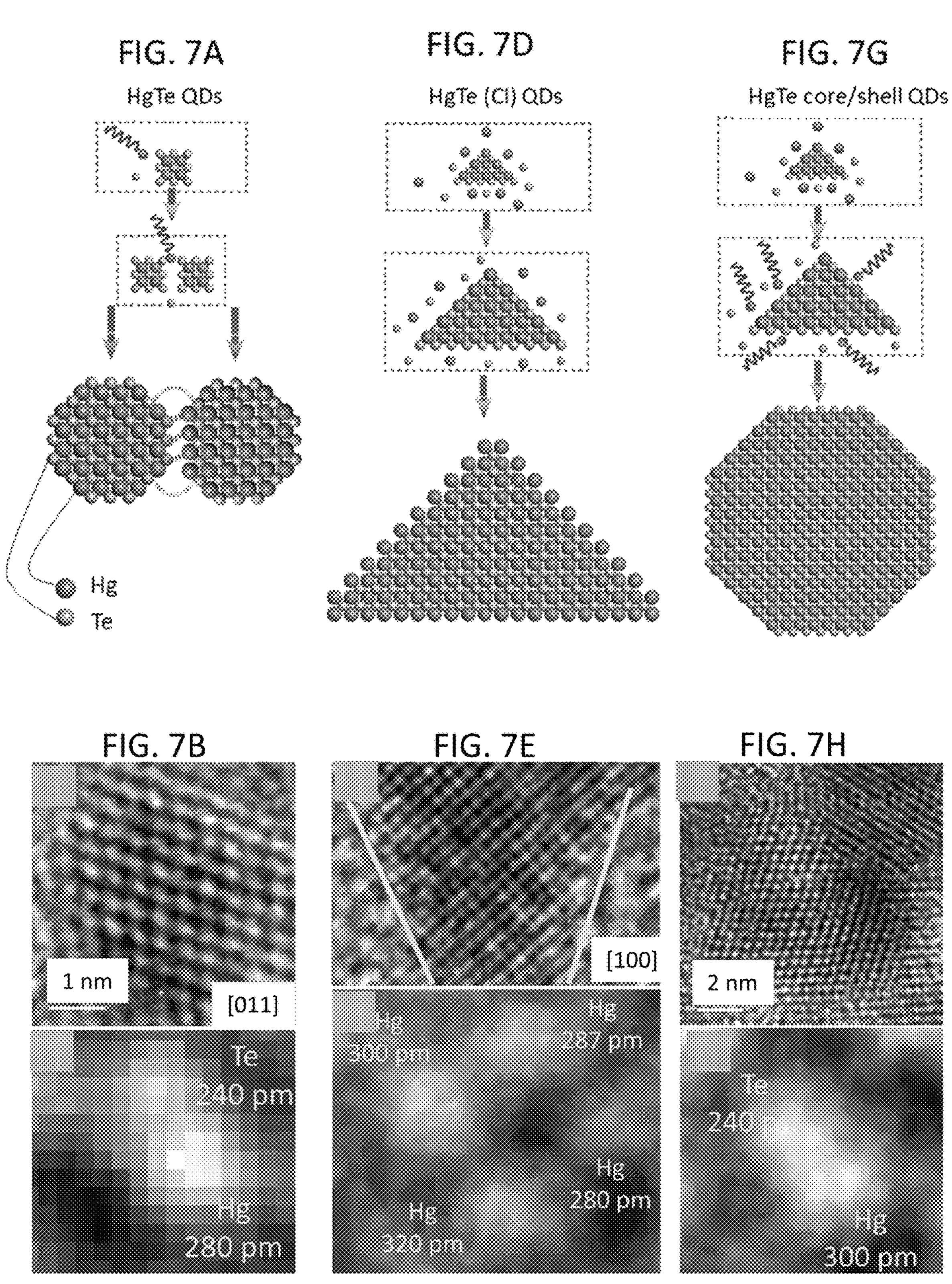
FIG. 7A shows a schematic illustration of the growth process of HgTe QDs synthesized using a mercury acetate precursor through grain-rotation-induced grain coalescence (GRIGC).
FIGS. 7B-7C show HRTEM images of these HgTe QDs.
FIG. 7D shows a schematic illustration of the growth process of HgTe (Cl) QDs synthesized using a $HgCl_2$ precursor via Ostwald ripening (OR) mechanism.
FIGS. 7E-7F show HRTEM images of these HgTe (Cl) QDs.
FIG. 7G shows a schematic illustration of the growth process of core/shell HgTe QDs (core grown via OR and shell grown via GRIGC).
FIGS. 7H-7I show HRTEM images of the core/shell HgTe QDs.

The mercury chalcogenide quantum dots may be characterized by the atoms present at surfaces of the quantum dots as well as a surface stoichiometry of those atoms. Related to the unique growth mechanism described above and as further described in the Example, below, it has been found that quantum dots synthesized using a mercury acetate precursor have both mercury atoms and chalcogen atoms present at their surfaces. Moreover, the surface stoichiometry of the quantum dots is 1:1, i.e., there is one mercury atom for every one chalcogen atom at the surfaces of the quantum dots. (It is understood that "1:1" encompasses perfect 1:1 stoichiometry, but in view of the inherent nature of chemical synthesis, does allows for minor deficiencies, e.g., in chalcogen atoms at the surfaces.) The presence of both mercury and chalcogen atoms at quantum dot surfaces at 1:1 surface stoichiometry for quantum dots synthesized using a mercury acetate precursor is demonstrated FIG. 7C. This is in contrast to FIG. 7F, showing quantum dots synthesized using a $HgCl_2$ precursor, for which only mercury atoms are present at the surface such that the quantum dots necessarily have a non-stoichiometric surface (i.e., the surface stoichiometry is not 1:1). FIG. 7I further demonstrates that core-shell quantum dots, for which the shell is synthesized using a mercury acetate precursor, can also result in quantum dots having both mercury and chalcogen atoms at quantum dot surfaces at a 1:1 surface stoichiometry. The unique surface characteristics of the present quantum dots are also believed to be due to the different growth mechanism accessible when using the mercury acetate precursor and thus, the superior properties of the present photodetectors. The surface characteristics may be confirmed from TEM images.

Prior to subsequent steps of the present methods as further described below, surfaces of the quantum dots have bound thereto one or more types of the stabilizing ligands described above. The present methods further comprise depositing the mercury chalcogenide quantum dots on the surface of graphene. Although graphene possesses a number of advantages and has been used in various optoelectronic structures, use of graphene as described in the present disclosure is based, at least in part, on the unexpected finding that deposition of the present mercury chalcogenide quantum dots on the surface of graphene actually reduces the noise current from graphene by at least an order of magnitude. (See FIG. 3B and the discussion in the Example, below.) As further described in the Example, below, it is believed that this result may be related to the use of the mercury acetate precursor, certain stabilizing ligands, particularly OLA, or both. This result is also further believed to contribute to the superior properties of the present photodetectors.

The graphene may be a monolayer of graphene. However, the graphene may be a multilayer structure comprising multiple sublayers of graphene, each sublayer corresponding to a monolayer of graphene. The lateral dimensions of the graphene are much greater than its thickness (whether monolayer graphene or multiple monolayers of graphene are used), and generally depend upon a desired channel width for the photodetector. The graphene may be "transferred," which refers to graphene which has been transferred from a growth substrate on which it was grown. The graphene may be "chemical vapor deposition (CVD)-synthesized," which refers to graphene which has been grown using CVD. The graphene may be "impurity-free," which refers to graphene having an amount of foreign elements/molecules adsorbed to the graphene which is zero or too small to affect the structure/properties of graphene. Prior to use in the present methods, the graphene may be subjected to a cleaning procedure (e.g., light-assisted vacuum annealing) to reduce/eliminate foreign elements/molecules on its surface. The high quality of the graphene may be evidenced by characteristic graphene bands as measured using Raman spectroscopy. Specifically, the intensity of the G, D, and 2D bands provides a measure of the quality of the graphene. An intensity ratio of 2D to G of about 2 and a negligible D peak (associated with amorphous carbon and other defects) are characteristic of a high-quality, clean, graphene monolayer (see FIG. 2B). The cleanliness of the graphene may be assessed by monitoring the resistance of the graphene as described in the Example, below. For example, clean graphene is associated with reduced carrier doping and, thus, increased resistance (Dirac point shifts towards zero) and reduced noise current.

Figures 9A, 9B, 9C, 9D, 9E, 9F:
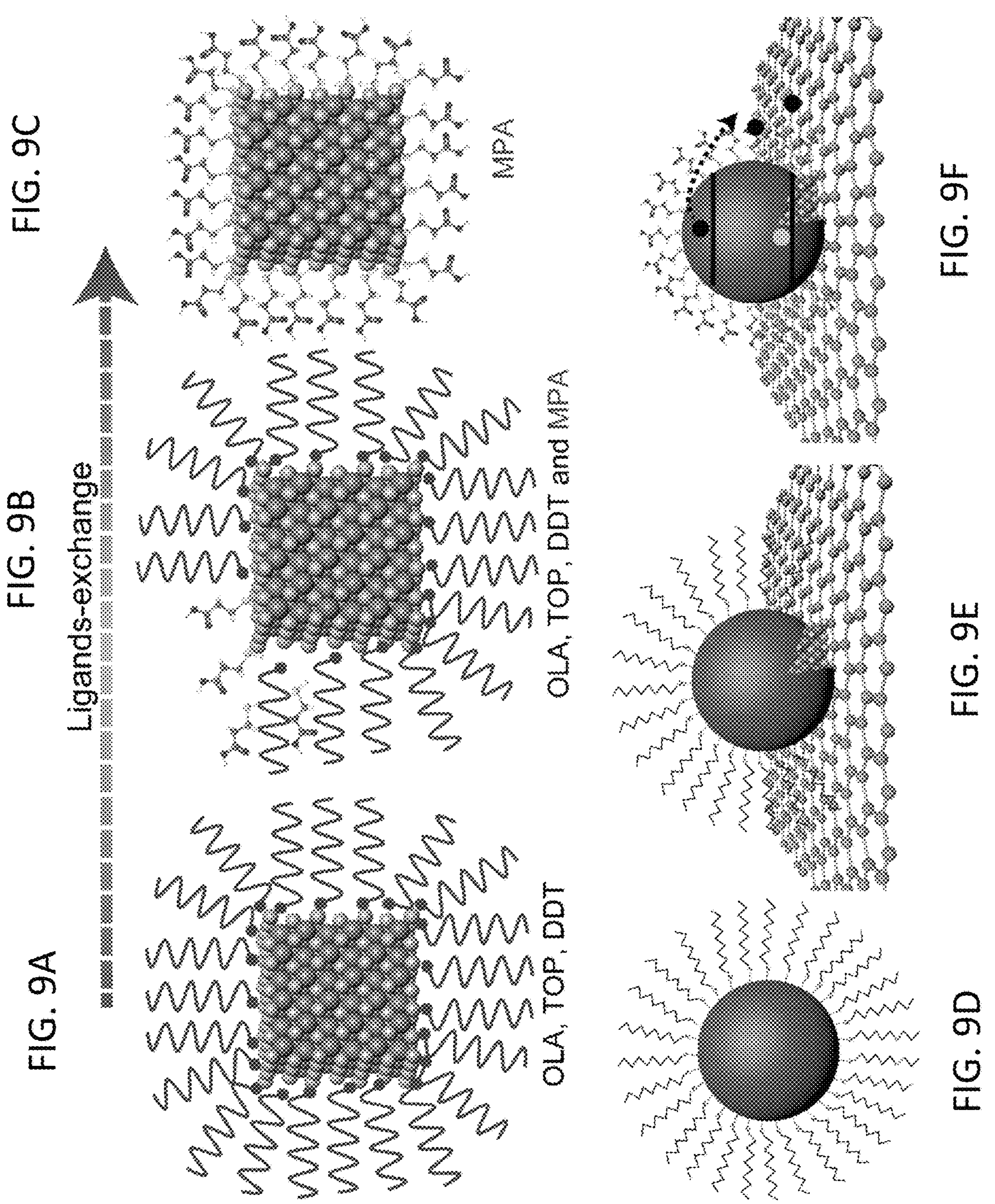
FIGS. 9A-9C illustrate the ligand-exchange process showing that the capping organic ligands of OLA, TOP and DDT on the HgTe QDs introduced during synthesis and stabilization (FIG. 9A) are replaced by more conductive and stable MPA ligands (FIGS. 9B-9C).
FIGS. 9D-9F illustrate the ligand-exchange process performed on the HgTe QDs/Gr nanohybrids prior to (FIG. 9D) and after exposure of the QD surface to graphene causes the organic capping ligands (OLA, TOP and DDT) to fall off at the QDs/Gr interface (FIG. 9E) to induce n-doping to graphene, followed by MPA ligand exchange to form a charge transfer pathway across the HgTe QDs/Gr interface and a passivation layer on all HgTe QDs (FIG. 9F).

The mercury chalcogenide quantum dots may be deposited on the graphene surface using various techniques, e.g., inkjet deposition as described in the Example, below. As schematically illustrated in FIG. 9D-9F, it is believed that the deposition results in displacement of stabilizing ligands from a portion of the quantum dot surfaces so that these portions of the quantum dot surfaces are in direct contact with the graphene surface, forming an interface therebetween. As noted above, it is believed that this displacement may be facilitated by use of certain stabilizing ligands, particularly OLA.

As noted above, the present methods further comprise exchanging stabilizing ligands on surfaces of the mercury chalcogenide quantum dots with 3-mercaptopropionic acid (MPA). This ligand exchange is generally conducted after deposition of the quantum dots onto the graphene surface as described above. The MPA may be provided in a ligand exchange solution comprising or consisting of the MPA and a solvent, e.g., an alcohol. Ligand exchange may be carried out by exposing the mercury chalcogenide quantum dots (e.g., as deposited on graphene) to the ligand exchange solution, e.g., by dipping. Other conductive ligands in addition to MPA may be included in the ligand exchange solution. However, in embodiments, only MPA is used. The conditions under which the exposure occurs, e.g., period of time, temperature, atmosphere, are selected to facilitate the exchange of the stabilizing ligands with MPA. However, the exposure may be carried out in ambient conditions (room temperature, atmospheric pressure). Illustrative conditions are provided in the Example, below. As further described in the Example, below, the use of MPA (as opposed to other exchange ligands), particularly to exchange with OLA on mercury chalcogenide quantum dots synthesized from mercury acetate, are features believed to contribute to the superior properties of the present photodetectors.

Figures 5A, 5B, 5C:
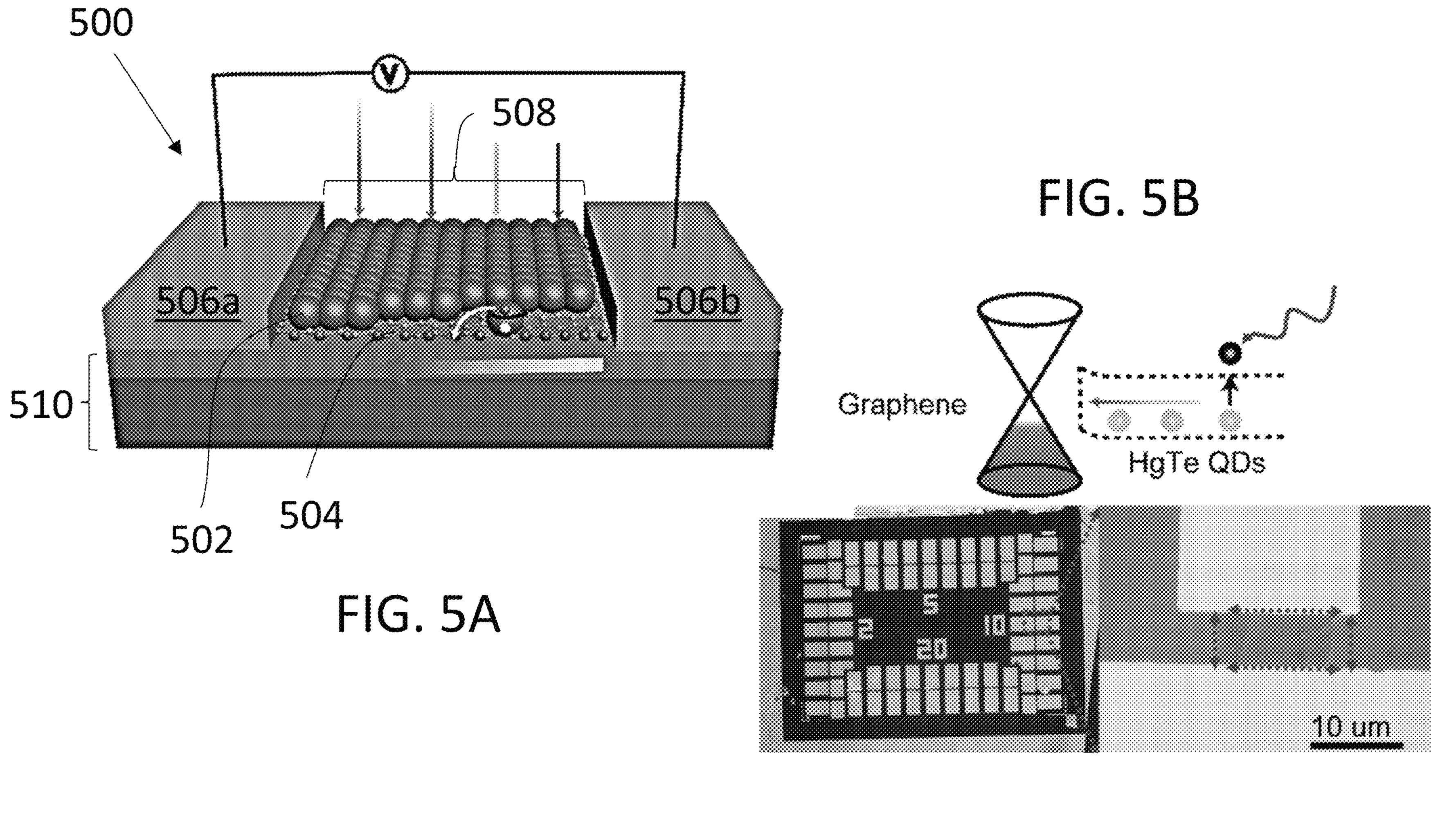
FIG. 5A shows a schematic of a HgTe QDs/Gr nanohybrid photodetector.
FIG. 5B shows the energy band structure and charger transfer process at the HgTe QDs/Gr interface. FIG.

The deposition of the mercury chalcogenide quantum dots may be carried out to form a single monolayer of the quantum dots on graphene as schematically illustrated in FIG. 5A, wherein the thickness of the monolayer corresponds to the diameter/width of the quantum dots. However, multiple layers of the quantum dots may be deposited to form a thicker quantum dot multilayer structure. In such embodiments, ligand exchange is generally conducted after each layer of quantum dots is deposited, before deposition of an additional quantum dot layer.

The photodetectors fabricated using the present methods are also encompassed by the present disclosure. The photodetectors are configured to detect infrared light. In embodiments, the photodetectors are configured to detect short-infrared (SWIR) light having wavelengths from about 1.4 mm to about 3 mm. In embodiments, the photodetectors are configured to detect mid-infrared (MWIR) light having wavelengths from about 3 mm to about 8 mm. As noted above, the bandgap energy of the photodetectors, and thus the detectable light, is tunable via characteristics of the mercury chalcogenide quantum dots, e.g., composition, size, etc.

An illustrative photodetector 500 is schematically illustrated in FIG. 5A. The photodetector 500 comprises a heterostructure comprising a layer 502 of HgTe quantum dots on graphene 504. The graphene 504 is in electrical communication with a pair of electrodes 506*a, b* separated so as to form a graphene channel 508 therebetween. The graphene 504 is supported by a base substrate 510, which, in this embodiment is a highly p-doped Si/$SO_2$ substrate (undoped substrates may also be used, particularly for photodetectors without a gate electrode). The present photodetectors may include any of the components shown in FIG. 5A in such a configuration.

The present photodetectors may be characterized by certain properties, including a responsivity R* and detectivity D*. These properties may be measured as described in the Example, below. In embodiments, the photodetector has a responsivity R* of at least $10^3$ A/W, $10^4$ A/W, or $10^5$ A/W. In embodiments, the photodetector has a detectivity D* of at least $10^{10}$ Jones, $10^{11}$ Jones, or $10^{12}$ Jones. These values may be referenced to one or more operating conditions, e.g., wavelength (2.25 mm), intensity (0.6 mW/$cm^2$), bias voltage (0.5 V or 1 V). These values may be achieved even without cooling the photodetector, i.e., operating the photodetector at room temperature (about 20° C. to 25° C.). As cooling is not required, the present photodetectors need not be operatively coupled to a cooling source, which is typically required of many existing IR photodetectors.

Example

Introduction

This Example evaluates the noise, responsivity R*, and detectivity D* of HgTe QDs/graphene (Gr) nanohybrids (i.e., heterostructures) for SWIR-MWIR detection. Intriguingly, the experiments in this Example revealed that the noise in HgTe QDs/Gr nanohybrids is dominated by the 1/f noise from graphene, which is unexpectedly reduced by the deposition of the HgTe QDs onto the graphene. Moreover, ligand exchange to provide the final photodetector establishes an efficient charge transfer pathway across the HgTe QDs/Gr interface with negligible impact on the noise of the HgTe QDs/Gr nanohybrids. These results demonstrate that, surprisingly, the HgTe QDs/Gr nanohybrids do not suffer from the dark current limitation in conventional IR detectors including those based on colloidal QDs films and thus, provide an ideal platform for high-performance IR detectors with no need for cryogenic cooling.

Experimental

Chemicals and Materials. Mercury (II) chloride ($HgCl_2$, ACS Reagent, >99.5, Sigma Aldrich), Mercury (II) Acetate (99.999% trace metals basis, Sigma Aldrich), Tellurium (99.999%, Sigma Aldrich), Oleylamine (OLA, technical grade 70%, Sigma Aldrich), Trioctylphosphine (TOP, technical grade 90%), 1-Dodecanethiol (DDT, >98%, Sigma Aldrich), Toluene (anhydrous, 99.8%, Sigma Aldrich). 3-Mercaptopropionic acid (MPA, >99%, Sigma Aldrich). All chemicals were used as received, except as specially stated. OLA was dried and degassed under vacuum at a temperature of 100° C. for 8 h before using.

HgTe QDs synthesis (mercury acetate precursor). HgTe QDs were synthesized as follows. 0.15 mmol of mercury acetate was dissolved in 8 mL oleylamine (OLA) in a 100 mL three-neck round bottom flask. The solution was heated to 80° C. for 1 h with stirring to dissolve the mercury acetate powder. A 0.15 mL portion of 1 M solution of tellurium in trioctylphosphine (TOP) was dissolved in 5 mL OLA in room temperature, forming a Te-TOP-OLA precursor solution. This Te-TOP-OLA solution was quickly injected into the mercury acetate precursor solution at 90° C. and reacted for 30 min. The Hg:Te molar ratio was 1:1. The reaction flask was cooled down by a water-ice mixture to room temperature. The HgTe QDs were stabilized with 1 mL of DDT and 100 mL of TOP. The HgTe QDs were washed twice with a mixture of acetate and methanol. The final precipitated HgTe QDs were dissolved in toluene.

HgTe QDs synthesis ($HgCl_2$ precursor). Some HgTe QDs were also synthesized using a different mercury precursor, $HgCl_2$. The synthesis of these QDs is described below in “Comparative Experiments.”

Core-shell HgTe QDs. Core-shell HgTe QDs were synthesized as follows. For the HgTe core synthesis, 0.15 mmol $HgCl_2$ was dissolved in 5 mL dried OLA in a 100 mL three-neck round bottom flask and heated to 100° C. with stirring for 1 h. Another 0.15 mmol Te-TOP-OLA precursor solution was rapidly injected at 100° C. and reacted 10 min. The prepared 0.1 mmol Hg acetate dissolved in 5 mL OLA and 0.1 mmol Te-TOP-OLA were then injected in situ into the above reaction solution and the HgTe QDs were kept at 90° C. for 30 min for the growth of the HgTe shell. Afterwards, the reaction flask was cooled down by water-ice mixture to room temperature. The HgTe core/shell QDs were stabilized with 200 L of TOP and 2 mL of DDT and then washed twice with a mixture of acetone and methanol solution. The final precipitated HgTe core/shell QDs were stored in Toluene for the future characterization and device fabrication.

Device fabrication. Monolayer graphene was grown using CVD and transferred onto the substrates. Graphene field effect transistor (GFET) fabrication used photolithography to define electrodes on the commercial $SiO_2$ (90 nm)/Si (doped) substrates, followed by deposition of Nb (40 nm)/Pd (10 nm) via DC sputtering at 75 W/90 W in Ar gas at an operating pressure of 14 mTorr/30 mTorr. After electrode liftoff, graphene was wet transferred onto the $SiO_2$ (90 nm)/Si (doped) substrates with the electrodes. Subsequently, additional photolithography was carried out to define the graphene channels with channel length of 2-20 μm and channel width of 20 μm. Reactive ion etching (RIE) of unwanted graphene in oxygen plasma was carried out in a Torr International RIE system. It is noted that the noise of graphene could be affected by charge scattering mechanisms including defects in graphene and adsorbed polar molecules on the top and bottom surface of graphene. Monolayer graphene consists of a single atomic layer of carbon atoms formed in hexagonal lattice in the ideal case. Thus, growth defects formed in CVD graphene and absorbed molecules from chemicals and solutions used in fabrication of the QDs/Gr nanohybrids in ambient can significantly and negatively impact the noise of graphene. As such, various precautions were taken to minimize this impact. Specifically, graphene growth was carried out in an optimal window to minimize growth defects and nonuniformity, as characterized using Raman spectroscopy in combination with the electric transport measurement. The Raman D/G peak ratio maps were collected over multiple areas of the sample to ensure low defect concentration. In addition, the graphene channel resistance was monitored over the entire process of the QDs/Gr device fabrication and characterization. The graphene samples used in this Example have sheet resistance $R_S$ in the range of 200 Ω/sq-300 Ω/sq before HgTe QDs deposition and 400 Ω/sq-600 Ω/sq after HgTe QDs deposition. The HgTe QDs suspended in toluene (5 mg/mL) were printed on the GFET channel using an inkjet microplotter (SonoPlot, Inc.). In order to pinpoint the role of graphene in the MWIR detection in the HgTe QDs/graphene nanohybrids, reference devices made of colloidal HgTe QDs thin films (without graphene) were fabricated on the substrates with the same electrodes using the same protocol for HgTe QDs deposition as in the QDs/Gr nanohybrids. This means the obtained HgTe QD film and HgTe QDs/Gr nanohybrid were identical except the presence of graphene in the latter.

Ligand Exchange. After synthesis of the HgTe QDs, the native ligands in the synthesis solution were exchanged with more conductive ligands on the HgTe QDs/Gr nanohybrids. A one-step MPA ligand exchange was applied using an MPA-methanol mixed solution with volume ratio of 1:1. The ligand exchange was optimized with respect to the processing time in the range of 30-120 seconds and optimal period was found to be around 90 s. The sample was then rinsed with methanol and dried with $N_2$.

Comparative Experiments. In a set of comparative experiments A and B using a different mercury precursor, $HgCl_2$ (in place of mercury acetate), HgTe QDs were synthesized. $HgCl_2$ (0.15 mmol) was dissolved in 5 mL dried OLA in a 100 mL three-neck flask. The solution was heated to 100° C. with stirring for 1 h in a Schlenk line system to dissolve the $HgCl_2$. A 0.15 mL (0.15 mmol) portion of 1 M solution of tellurium in TOP was rapidly injected at 100° C. and reacted 10 min. The three-neck flask was cooled down by an ice-water mixture to room temperature. 5 mL tetrachloroethylene, 1 mL DDT, and 1 mL of TOP were injected to the solution for 20 min with stirring. The solution was precipitated with an equal volume of 2 propanol (IPA) and centrifuged. The precipitate was dissolved in 10 mL chlorobenzene. Prior to printing, the HgTe QDs were mixed with 80 μL of 0.1 M didodecyldimethylammonium bromide solution in IPA to aid in redispersal. IPA was added and centrifuged at 4000 RPM for 4 min, and the precipitant was redissolved in 80 μL of chlorobenzene and 320 μL of butyl acetate.

The HgTe QDs synthesized using $HgCl_2$ were printed onto graphene channels formed between electrodes as described above and two types of ligand exchange steps were compared. In comparative experiment A, ligand exchange was conducted using MPA as described above. In comparative experiment B, ligand exchange was conducted using a ligand exchange solution of 1,2-ethanedithiol (EDT)/HCl/isopropyl alcohol (IPA) (with volume ratio of 1:1:20). The printed HgTe QDs/GFET hybrid photodetectors were dipped into this comparative ligand exchange solution for 10 seconds under ambient conditions, then rinsed by IPA and blow dried using $N_2$.

Other comparative experiments C1-C4 were conducted using HgTe QDs synthesized using the mercury acetate precursor and OLA stabilizing ligands, but employing other ligand exchange steps. In comparative experiments C1 and C2, the ligand exchange used EDT/HCl/IPA (with volume ratio of 1:1:20). In comparative experiment C3, the ligand exchange used 3-mercaptopropyl trimethoxysilane (MPS)/$H_2O$/IPA (with weight ratio of 1:1:40). In comparative experiment C4, the ligand exchange used EDT/HCl/acetonitrile (with volume ratio of 1:1:20).

Sample Characterization. Absorption spectra were taken using a Nicolet 6700 FTIR instrument (Thermo Fisher Scientific) on HgTe QDs/Gr nanohybrids on fused silica substrates before and after the HgTe QD deposition, and the follow-up ligand exchange. A field-emission transmission electron microscope (JEOL 2100) was used to characterize the size, morphology and nanostructures of the HgTe QDs. The samples were prepared over 300 mesh Cu-holly carbon grids. The TEM images were analyzed and the FFT simulated in DigitalMicrograph® software. The crystal projections of the HgTe structure were simulated in Vesta@ software. The electronic and optoelectronic properties of the GFET and HgTe QDs/Gr nanohybrid photodetectors were characterized using a semiconductor analyzer (Agilent B1505A). Diode lasers of different wavelengths in SWIR (2.25 μm, RPMC) and MWIR (3.25 μm and 4.0 μm, Thorlabs) spectra or the FTIR system were used as the SWIR and MWIR light source to illuminate the active area of the HgTe QDs/Gr photodetectors. The incident light power density was calibrated using a certified Thorlabs meter. The noise spectra of GFETs and HgTe QDs/Gr nanohybrid devices were tested using a SR760 fast Fourier transform (FFT) spectrum analyzer using a homemade probe with EM shielding. For the noise measurement, the DC voltage was provided from a low-noise battery and the range of the voltage can be continuously varied in the range of 0-12 V via a homemade variable resistor box. The noise was measured in the frequency range from 15.6 Hz to 1700 Hz, and the noise data was recorded by taking an average of 50 measurements. The $I_{SD}$-$V_{BG}$ curves of the GFETs were measured using a probe station connected to an Agilent B1505A semiconductor parameter analyzer.

The noise power spectral density ($S_I$, NSD) is defined as the amount of noise power per unit frequency bandwidth in the current signal of a device, which is expressed in the unit of $A^2$/Hz. The noise current spectral density (NCD) is the square root of $S_I$, with units of A/√Hz. The noise raw data was measured using an SR760 FFT spectrum analyzer (Stanford Research) in the noise voltage density mode (NVD, in the unit of V/√Hz). The circuit was powered by a home built low-noise battery operated DC voltage power supply. NCD was first calculated by dividing NVD by the resistance of the graphene device. Next, $S_I/I^2$ (in the unit of $Hz^{-1}$) was calculated by taking the square of NCD, to get $S_I$, then dividing by the square of source-drain current (in the unit of A) at the same bias voltage. This quantity eliminates the contribution of bias voltage as well as geometric dimensions of graphene channel on the amplitude of noise, thus will reflect the charge scattering mechanisms of graphene relevant to its noise.

Results and Discussion

Figure 1D:
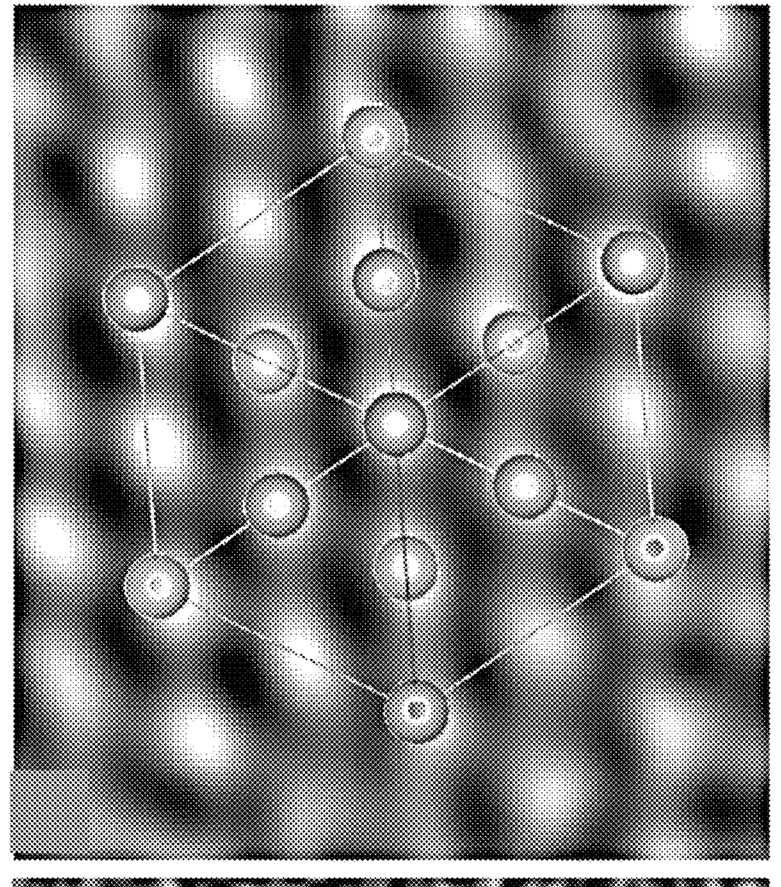
Figure 1D:
Figure 1C:
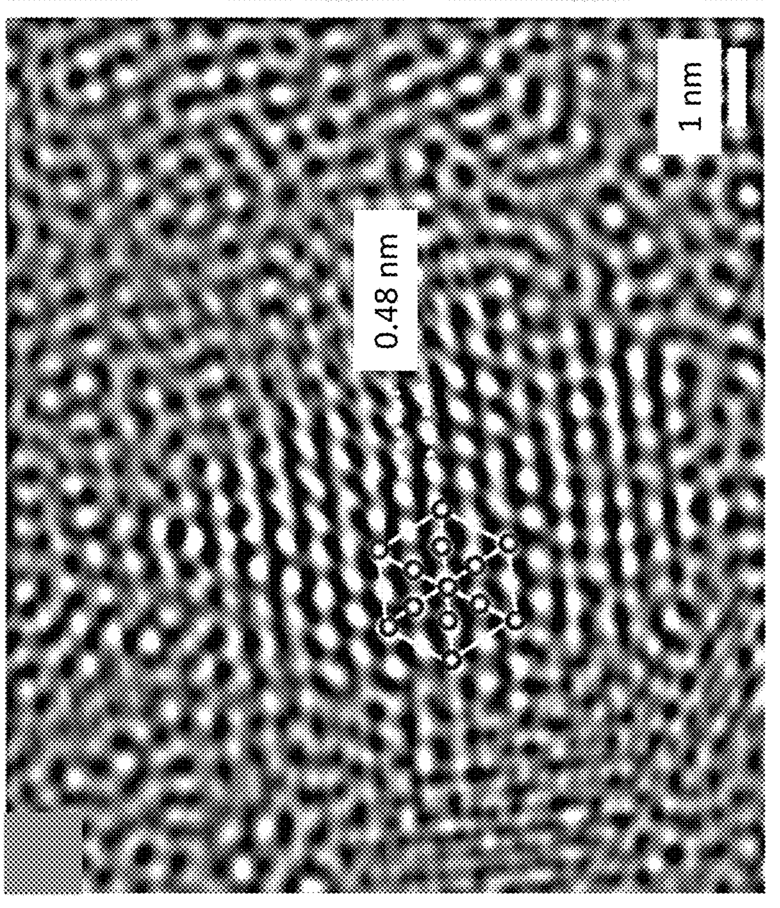
Figures 1E, 1F, 1G:
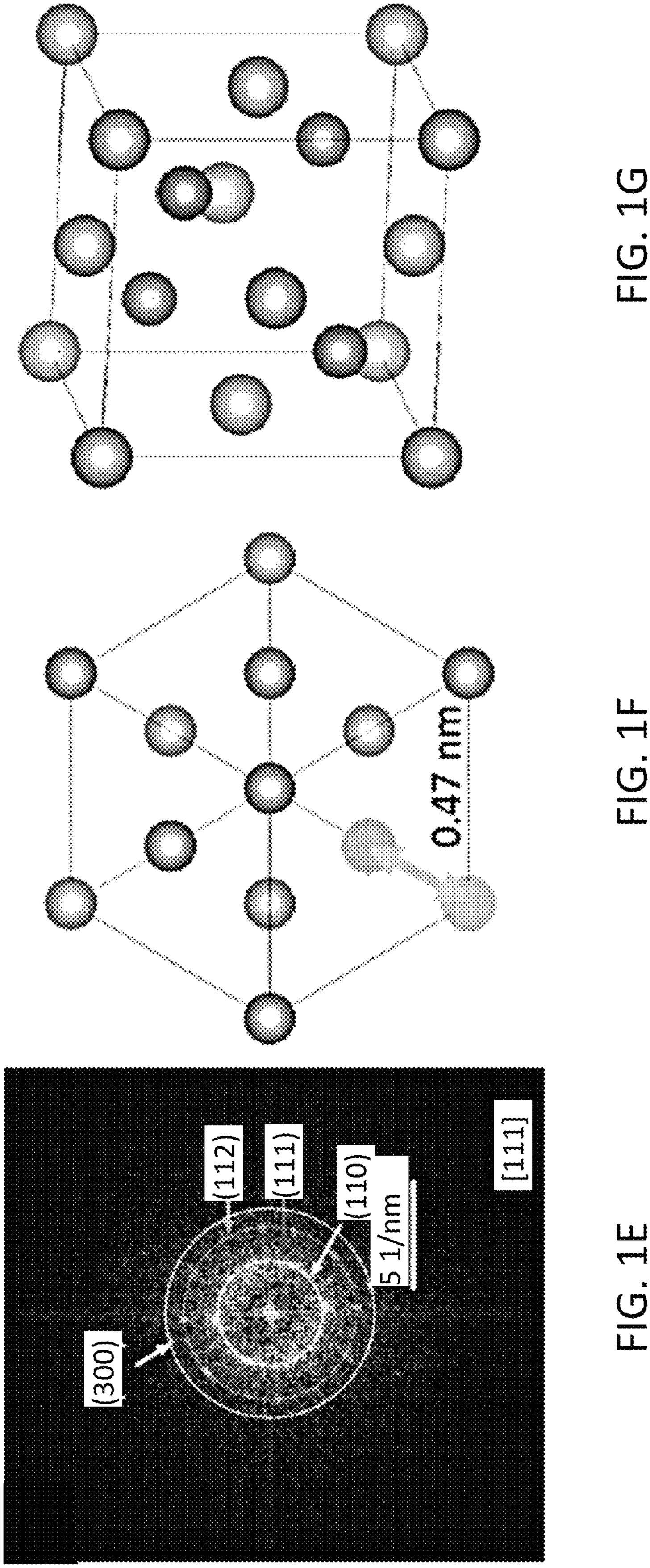
Figure 1H:
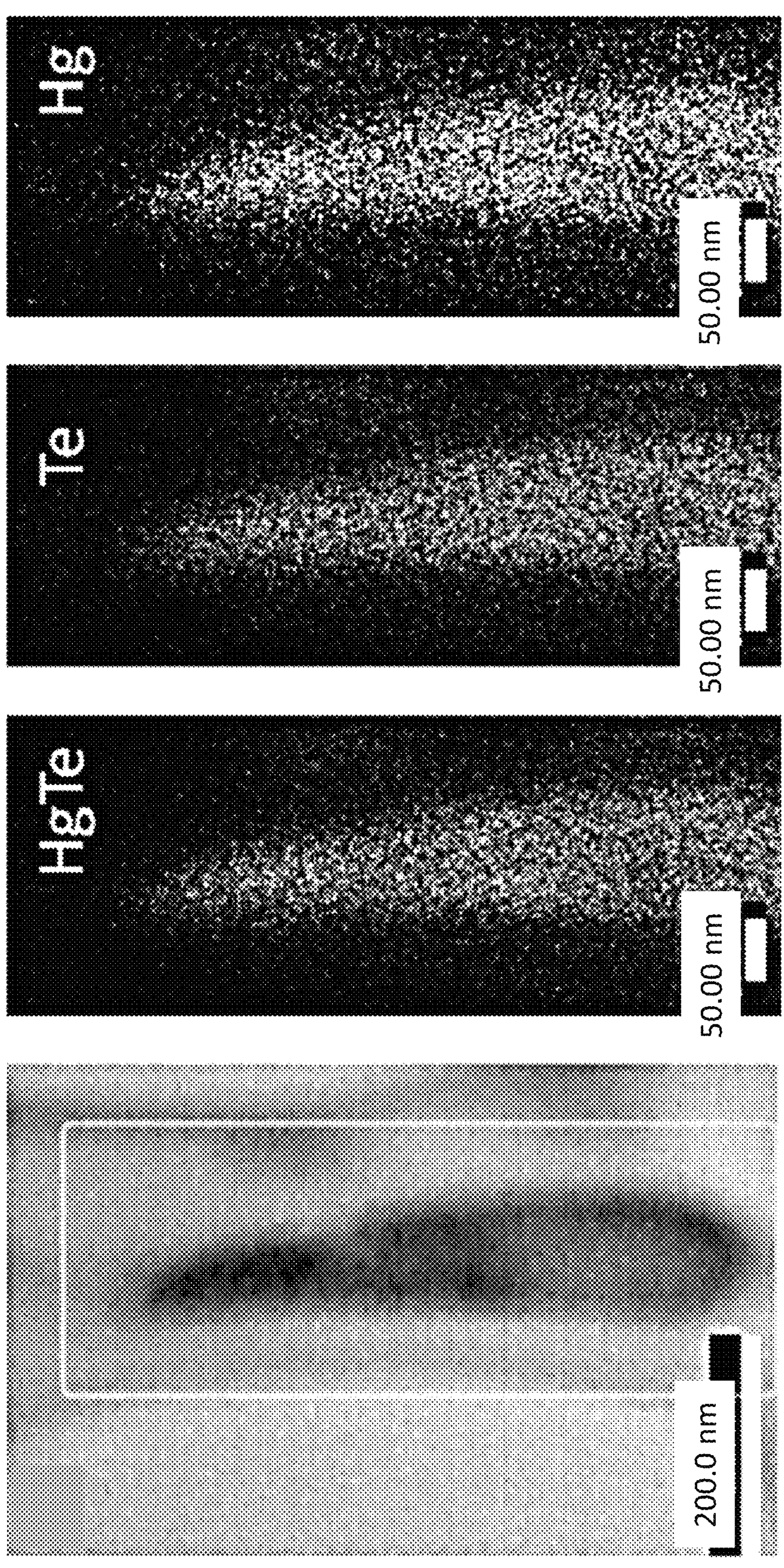

FIG. 1A shows a low-resolution transmission electron microscopy (TEM) image of the HgTe QDs (synthesized using mercury acetate) and the inset shows the QDs size distribution averaged at ~3.9 nm. The high-resolution TEM (HRTEM) images in FIGS. 1B-1C confirm the zincblende structure for HgTe (FIG. 1D), which agrees well with the simulated electron diffraction pattern in FIG. 1E. The extracted lattice distance of 0.48 nm is associated with the (110) surface plane of zincblende for the HgTe QDs. FIGS. 1F-1G show the schematic crystal structure of zincblende HgTe. The energy dispersive X-ray (EDX) elemental maps of Hg and Te (FIG. 1H) illustrate overlapping of the Hg and Te species with similar intensity throughout the QDs.

Figures 2A, 2B:
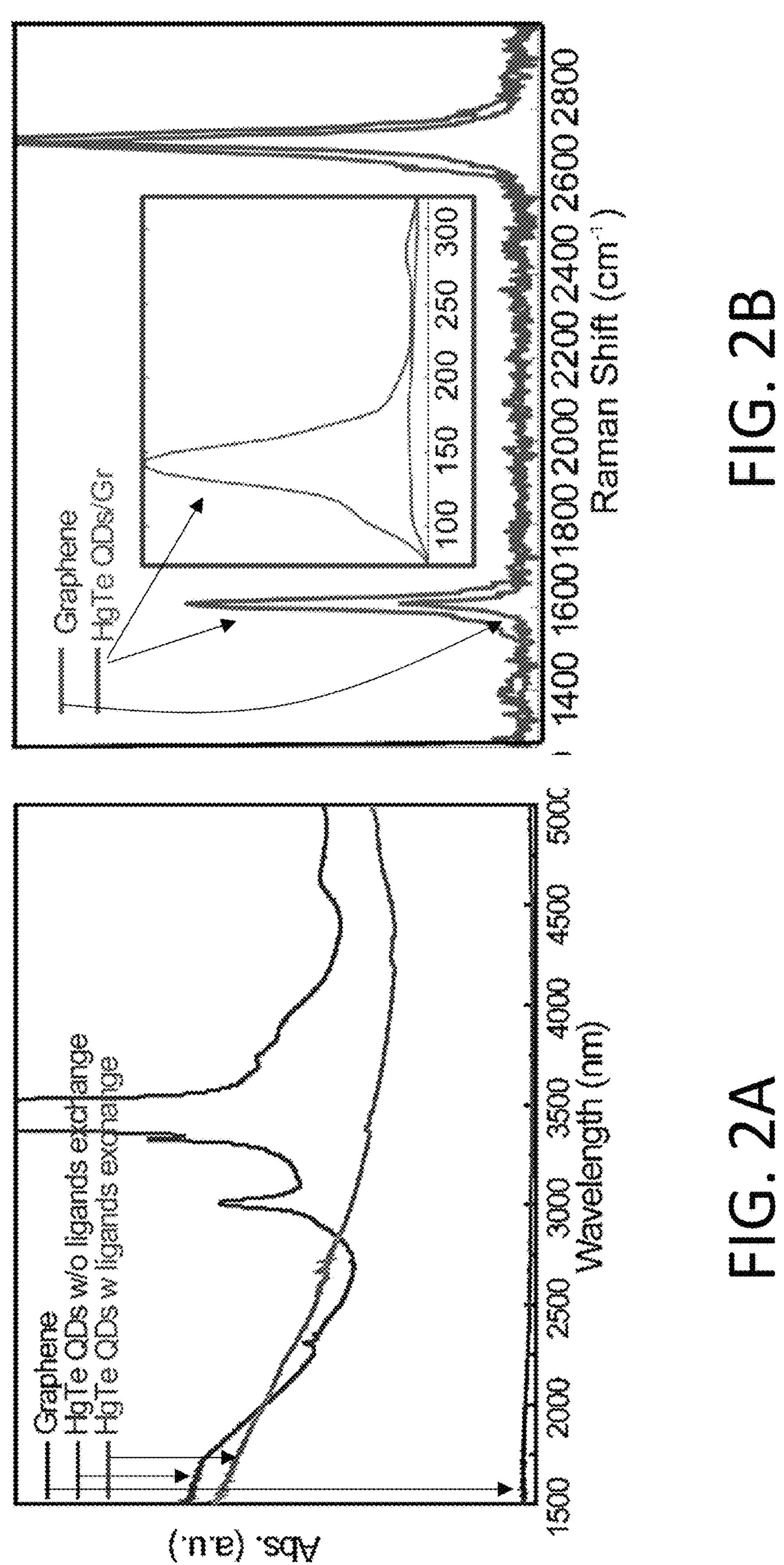
FIG. 2A shows the optical absorption spectra of the HgTe QDs/Gr nanohybrid photodetector on fused silica before (graphene) and after (HgTe QDs w/o ligands exchange) HgTe QDs deposition, and the follow-up MPA ligand exchange (HgTe QDs w ligands exchange).
FIG. 2B shows Raman spectra of graphene before and after the HgTe QDs deposition. The inset shows the Raman bands of the HgTe QDs at 140 $cm^{-1}$ and 280 $cm^{-1}$.

The optical absorption spectra of the HgTe QDs/Gr nanohybrids before (graphene) and after (HgTe QDs w/o ligands exchange) the HgTe QDs deposition are compared in FIG. 2A. Considering the absorption of graphene is negligible, the IR absorption of the HgTe QDs/Gr nanohybrids is dominated by the HgTe QDs, showing a broadband absorption spanning from 1.5 μm to 5.0 μm. The sharp peaks around 3.0 μm and 3.5 μm can be ascribed to the molecular vibration absorption from organic ligands in the HgTe QD synthesis solvent such as oleylamine (OLA) chemisorbed to the surface of the HgTe QDs. The presence of these organic, insulating ligands has a negative effect not only by reducing the MWIR absorption of the QDs, but also blocking the charge transfer from the HgTe QDs to graphene. However, these peaks disappear after exchanging the OLA ligands with 3-mercaptopropionic acid (MPA) ligands (HgTe QDs w ligands exchange). Raman spectra taken on graphene before and after the deposition of the HgTe QDs are shown in FIG. 2B. The characteristic G band (1610 $cm^{-1}$) and 2D band (2718 $cm^{-1}$) of graphene can be clearly seen before and after the HgTe QDs deposition. These two bands are due to the doubly degenerate zone center $E^2_g$ mode and the second order of zone-boundary phonons, respectively. The ratio between the 2D and G band intensities is around 3.78 on graphene before the HgTe QD deposition, confirming the graphene used in this Example is monolayer graphene. This is further supported by fitting the 2D peak with a single Lorentzian peak (data not shown). After the HgTe QDs deposition, two subtle changes were observed. One is the decreased ratio between the 2D and G band intensities to 1.49. Considering QDs deposition is unlikely to affect the number of graphene layers, the observed change in the 2D/G band intensity ratio is indicative of the interaction at the HgTe QDs/Gr interface. Indeed, a right shift of the 2D band by ~10 $cm^{-1}$ to 2728 $cm^{-1}$ (data not shown) after the introduction of the HgTe QDs indicates that the graphene has received n-type doping from the HgTe QDs deposition. Notably, the graphene G band at 1610 $cm^{-1}$ had no observable shift in peak position. In addition, the D band was not visible before or after the HgTe QDs deposition, indicating the HgTe QDs deposition did not cause any significant defect or damage to the graphene. Therefore, the changes in 2D band of graphene by deposition of the HgTe QDs is most likely associated with a change in the electronic structure of the graphene. Besides the graphene Raman bands, two minor Raman bands were observed at low wave numbers (see the inset of FIG. 2B), i.e., 140 $cm^{-1}$ and 280 $cm^{-1}$ These are assigned to crystalline HgTe, representing the first and second order longitudinal-optical phonon bands (LO and 2LO). The significantly lower intensity of the 2LO band as compared to the LO band reflects the presence of defects within the HgTe crystal lattice, a common feature of colloidal QDs.

Figures 3A, 3B:
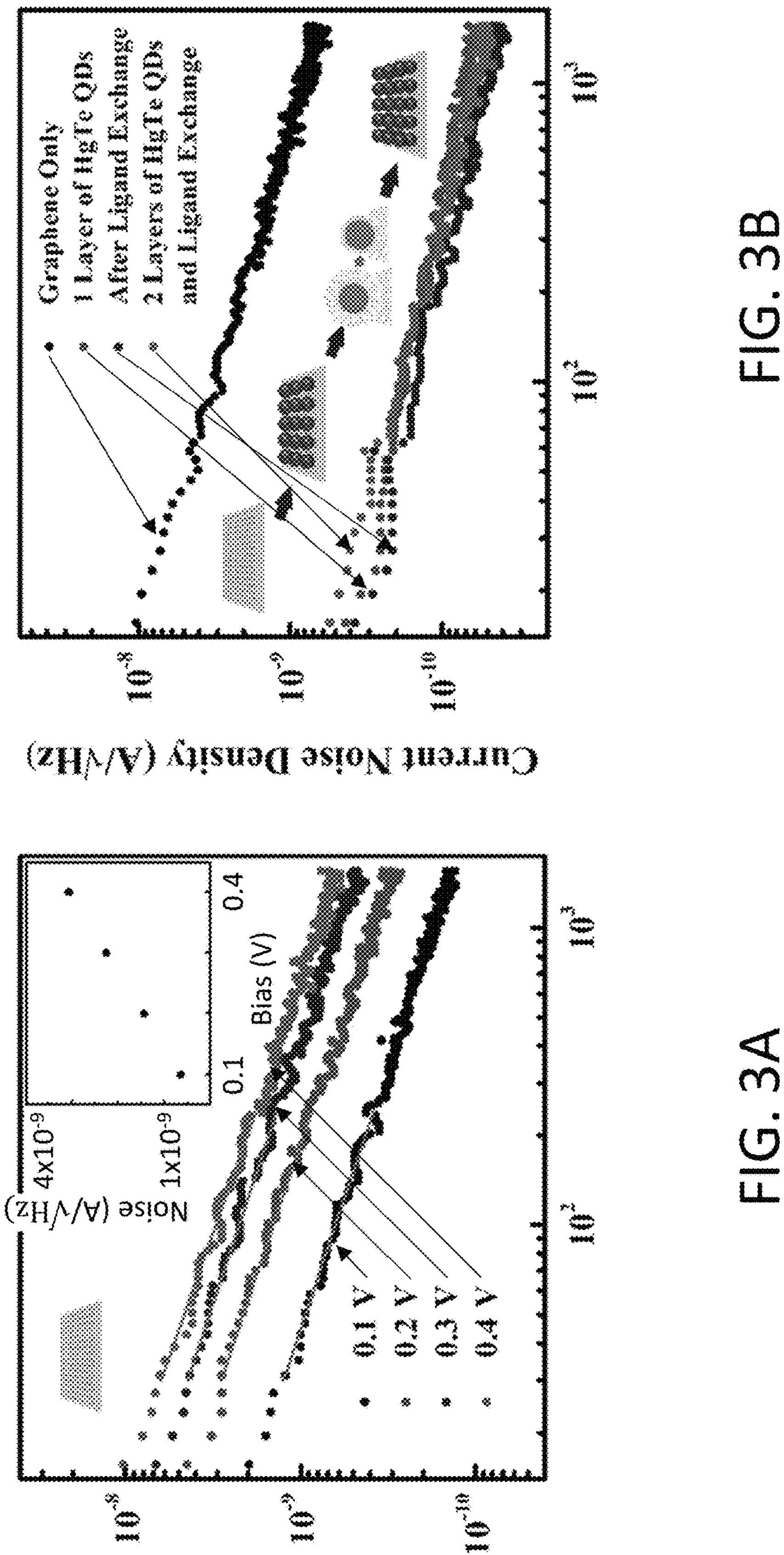
FIGS. 3A-3D show noise spectra measured from graphene samples and HgTe QDs/Gr nanohybrid devices.

To understand the noise mechanism in HgTe QDs/Gr nanohybrids, especially after HgTe QDs (synthesized using mercury acetate) deposition on graphene (which could change the electronic structure of graphene and hence noise of the device) noise spectra were collected before and after HgTe QDs deposition at bias voltages ($V_{sd}$) in the range of 0-1.0 V (similar to the bias voltage used for measurement of the photoresponse in the HgTe QDs/Gr nanohybrid photodetectors). FIG. 3A shows the noise spectra of a graphene sample before HgTe QDs deposition at $V_{sd}$ of 0-0.4 V. In the low frequency (f) range up to ~1000 Hz, the noise current density spectra are well fit by ~1/f, indicating the 1/f noise dominates the noise of the graphene channel at low frequencies. In addition, the amplitude of the noise current density increases linearly with $V_{sd}$ as shown in the inset of FIG. 3A.

FIG. 3B compares the noise spectra taken at $V_{sd}$=0.4 V on a graphene sample before and after two consecutive depositions of the HgTe QDs with an MPA ligand exchange performed after each deposition. Unexpectedly, approximately an order of magnitude decrease in the noise current was observed after the HgTe QDs were deposited. In fact, the noise spectra of the samples after the first HgTe QDs deposition, after the first 3-Mercaptopropionic acid (MPA) ligand exchange, and after the second HgTe QDs deposition plus the second MPA ligand exchange almost coincide, indicating the first layer of the HgTe QDs itself reduced the noise. Repeating the noise measurement on the HgTe QDs/Gr nanohybrids at variable $V_{sd}$ values in the range of 0.1-0.4 V (FIG. 3C) revealed a similar trend to the case of graphene only (FIG. 3A). Specifically, the noise current density amplitude exhibited a 1/f frequency dependence and increased linearly with increasing $V_{sd}$. This suggests that the noise in the HgTe QDs/Gr nanohybrids is primarily from graphene. Surprisingly, the thermal noise in HgTe QDs (generally expected for semiconductors having low bandgap energies) did not add additional noise to that from the graphene channel, but rather reduced the overall noise of the device considerably by up to an order of magnitude as shown in FIG. 3B.

Figure 3D:
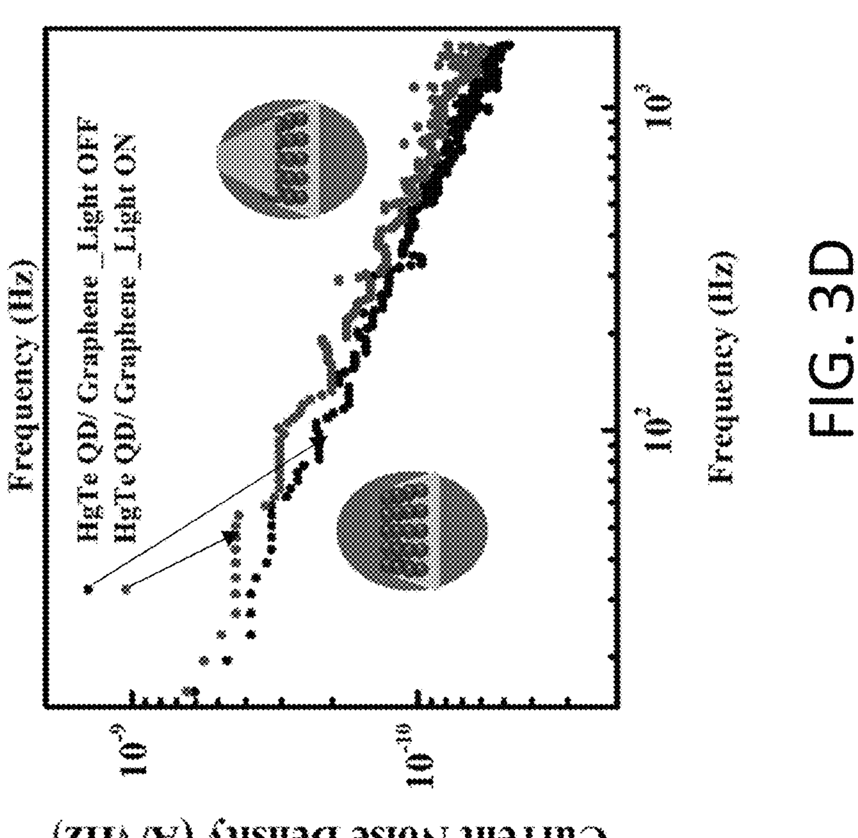
Figure 3C:
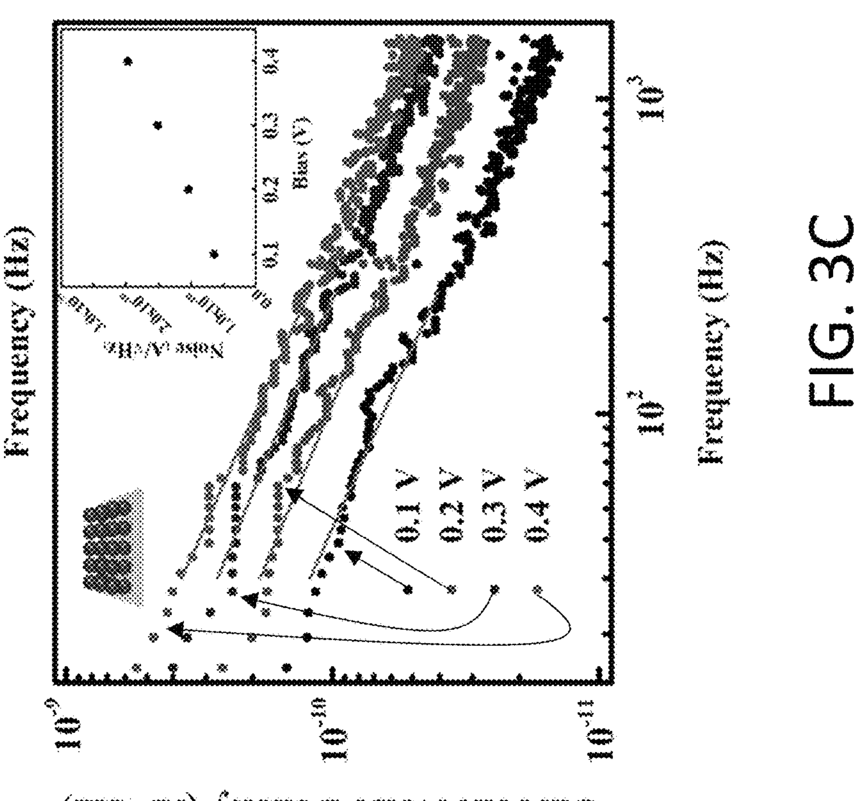

Furthermore, the noise amplitude was not affected by the illumination. Specifically, FIG. 3D shows comparable noise spectra measured when the HgTe QDs/Gr nanohybrid was in dark or illuminated with a broadband light source of intensity of ~23 mW/cm$^2$. These observations are important because they suggest the noise in the QDs/Gr heterojunction nanohybrids has a different origin from that of conventional semiconductors. Moreover, the results show that the dark-current limitation that has led to the conventional use of cryogenic cooling for conventional IR detectors is surprisingly not necessary for these QD/graphene nanohybrids, enabling uncooled IR detection at wavelengths of 1.7 mm and greater.

Figures 4A, 4B:
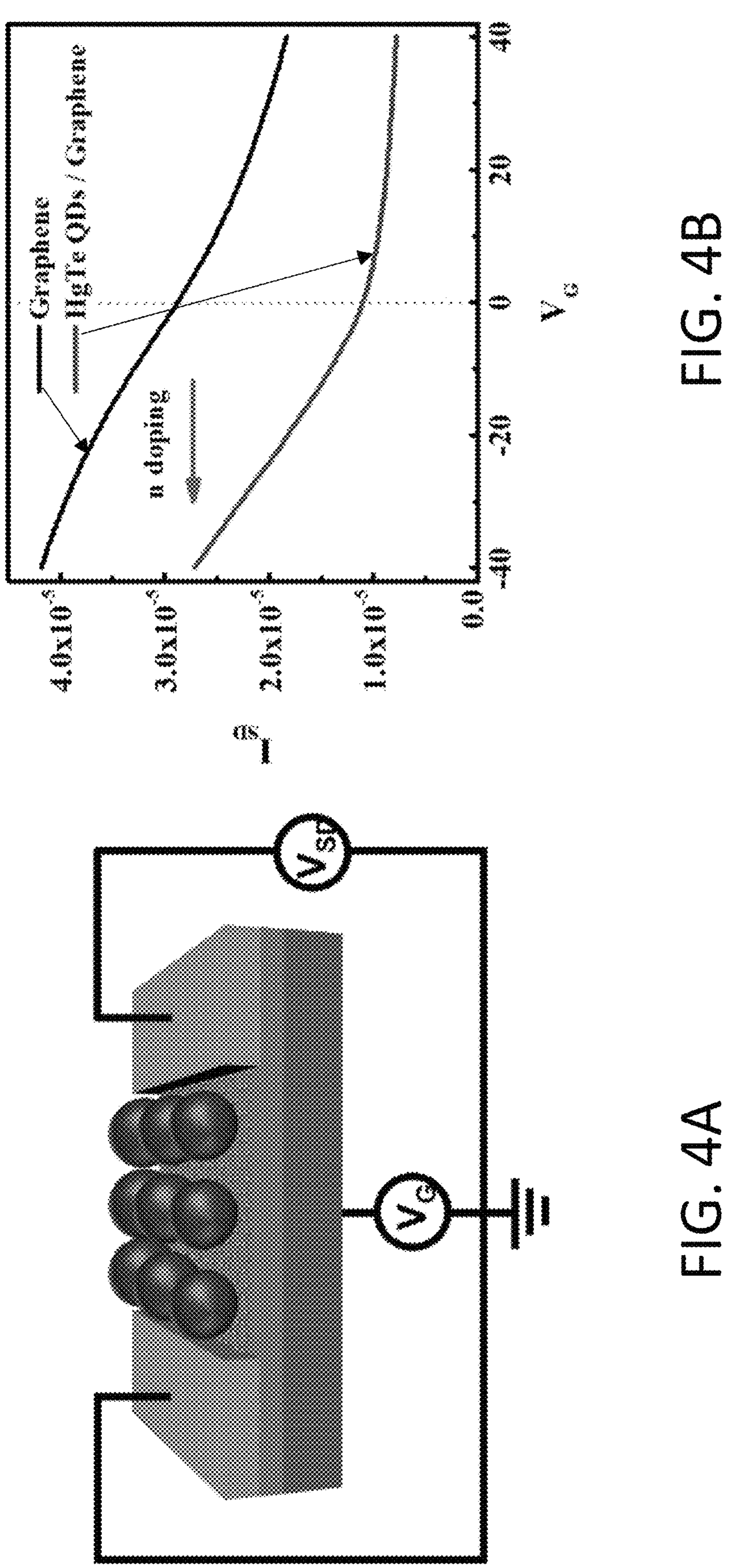
FIG. 4A shows a schematic of a HgTe QDs/GFET nanohybrid photodetector with back gate voltage $V_G$ applied.
FIG. 4B shows a comparison of normalized $I_{sd}$-$V_G$ curves taken on a GFET and a HgTe QDs/GFET, respectively. GFET channel dimensions were 10 μm (L)×20 μm (L) and $SiO_2$ gate thickness 90 nm. $V_{SD}$ was 10 mV.

To shed light on the origin of noise reduction in HgTe QDs/Gr nanohybrids after the HgTe QDs (synthesized using mercury acetate) deposition, source-drain current ($I_{SD}$) was measured as a function of back-gate voltage ($V_G$) on graphene field effect transistors (GFETs) shown schematically in FIG. 4A. FIG. 4B compares the $I_{sd}$-$V_G$ curves of a GFET before and after the HgTe QDs deposition. It is noted that GFETs made from graphene grown using chemical vapor deposition (CVD) are typically p-doped when measured in air. When measured in air, only the left or hole branch of the typical $I_{SD}$-$V_G$ curve of the graphene channel could be seen in the $V_G$ range of −40 V to +40 V since the Fermi energy of graphene is shifted to below the Dirac point (at $V_G$=0) by the p-doping. In fact, the suppression of electron branch (on the right of the minimum conductance at the Dirac point) is typical on GFETs due to the polar molecules such as $H_2O$ adsorbed on graphene surface. These polar molecules can be removed using light-assisted vacuum annealing (data not shown). Upon the HgTe QDs deposition, a left shift of the $I_{SD}$-$V_G$ curve was observed. This indicates the n-doping on graphene by the deposited HgTe QDs, which is consistent with the 2D band right shift on the Raman spectra in FIG. 2B. In order to rule out the possibility that this n-doping was induced by the solvent molecules (specifically toluene in this Example) in the HgTe QDs suspension, the $I_{SD}$-$V_G$ curves measured on a GFET before and after toluene deposition are compared in FIG. 4C. The negligible difference between the two $I_{SD}$-$V_G$ curves confirm that the left shift of the $I_{SD}$-$V_G$ curve in FIG. 4B is indeed induced by the HgTe QDs. This also suggests that the noise in graphene as measured in the laboratory may be considerably higher than the intrinsic noise value in graphene due to the presence of molecules adsorbed to graphene.

In order to further evaluate the hypothesis that polar molecules from ambient may be responsible for increasing the noise above that of which is intrinsic to the graphene, a noise study was carried out on graphene samples (data not shown) after they were left in air for extended period of many days, then placed in a vacuum of ~$10^{-6}$ Torr for more than 24 hours with light-assisted annealing, and lastly exposed to air again for four days. Interestingly, reduced noise was confirmed after the light-assisted vacuum annealing. In addition, this process was repeatable as the noise would always return to the original, higher value after the sample was exposed to air for >four days. Quantitatively, the difference in the noise amplitudes of graphene in air and in vacuum may vary from sample to sample, which explains the variable noise reduction of HgTe QDs/Gr nanohybrids after HgTe QDs deposition. This result therefore suggests that the noise of the HgTe QDs/Gr nanohybrids, which is dominated by that from the graphene channel, is affected by the polar molecules (mostly from air) adsorbed on graphene, which give the graphene higher noise than its intrinsic value. Since the HgTe QDs/Gr device fabrication is carried out in air, the presence of the polar molecules on graphene is unavoidable. Therefore, the reduction of the noise after the HgTe QDs deposition is most likely attributed to the reduction of the charge doping effect by the polar molecules, enabling the realization of lower noise closer to the intrinsic noise value of graphene. Other data not shown replots the current noise power spectral density normalized to the mean square of current ($S_I/I^2$) of the graphene before and after the HgTe QDs deposition. The $S_I/I^2$ spectrum of the graphene before HgTe QDs deposition is in the range comparable to that reported on graphene measured in air. However, after the HgTe QDs deposition, the $S_I/I^2$ is significantly decreases by almost two orders of magnitude. Therefore, this Example has not only revealed that the noise in the QDs/Gr nanohybrids is dominated by the noise in graphene, but also demonstrates that further reduction of the graphene noise is possible by deposition of the present HgTe QDs even though the HgTe QDs/Gr nanohybrids fabrication is itself is performed in air and involves various chemicals and solvents.

Figures 4C, 4D:
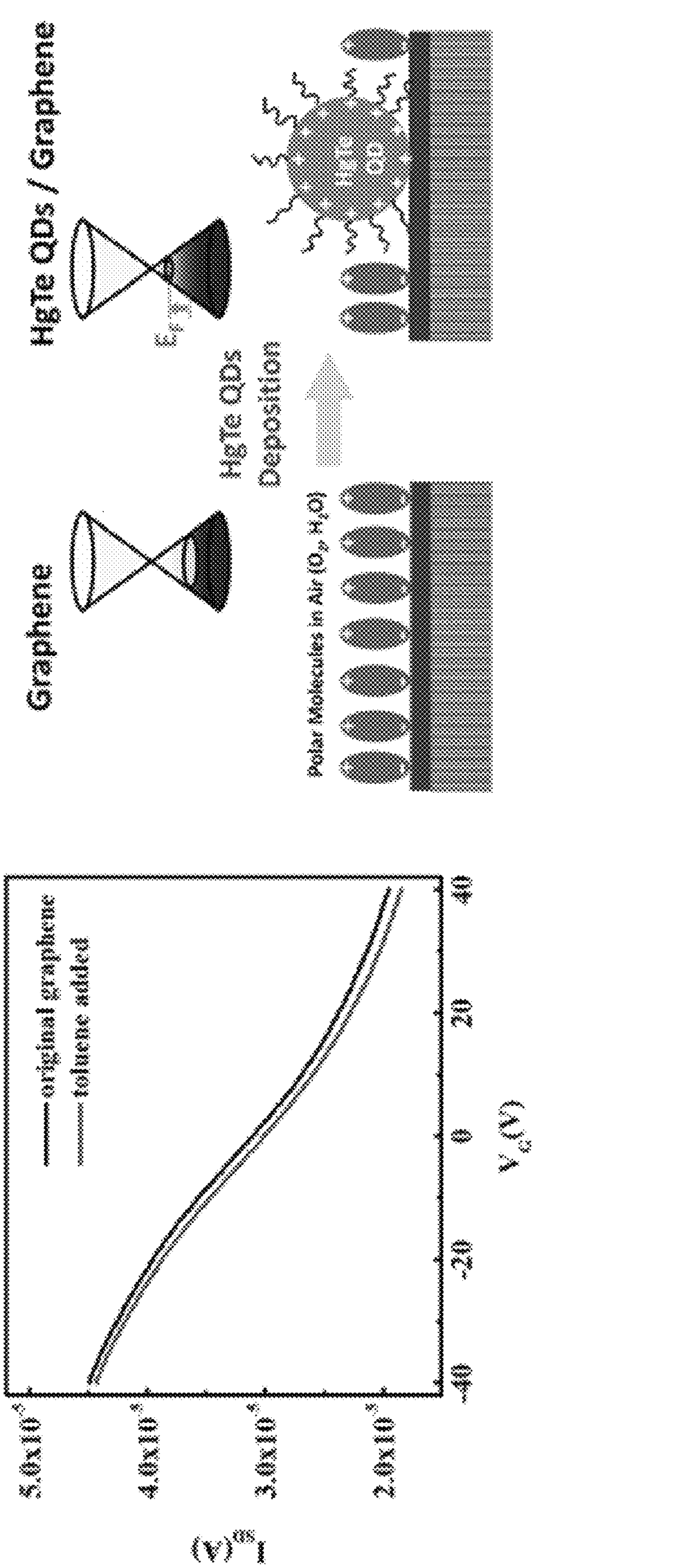
FIG. 4C shows a comparison of $I_{sd}$-$V_G$ curves of the GFET with original graphene and GFET after adding toluene on graphene.
FIG. 4D shows a schematic of graphene and its electronic structure with unintended polar molecules from air (p-doping) and HgTe QDs (n-doping).

FIG. 4D schematically illustrates the mechanism of the deposited HgTe QDs reducing the unintended charge doping by the adsorbed polar molecules and other species on graphene. The polar molecules in air, such as $H_2O$ and $O_2$, adsorbed on graphene surface induce p-doping on graphene, lead to graphene's Fermi energy (Ef) shifting below the Dirac point as shown in FIG. 4D (left). The HgTe QDs deposited on graphene induce n-doping in graphene considering the surface of the HgTe QD is most likely Te deficient, which leads to the formation of a layer of positive charges (surface dipole pointing inward) due to the $Hg^{+2}$ on the surface of the HgTe QD as shown in FIG. 4D (right). Therefore, the n-doping effect of the HgTe QDs deposition on graphene leads to an up-shift of the Ef and decreased noise by reducing the unintended doping on graphene. This result also suggests that further reduced noise may be achieved by completely removing the unintended doping in graphene.

It is also noted that the hole branch of the $I_{SD}$-$V_G$ branch on the left of the Dirac point (data not shown) was used in the operation of the HgTe QDs/Gr nanohybrids at $V_G=0$ for photodetection. The carrier mobility (p) was estimated using this branch and the obtained value is in the range of tens to hundreds $cm^2V^{-1} s^{-1}$ at room temperature. For example, for the HgTe QD/Gr sample in FIG. 4B, $\mu\sim510\ cm^2V^{-1}\ s^{-1}$, while $\mu$ was around 40-80 $cm^2\ V^{-1}s^{-1}$ for another sample (data not shown). The former is comparable to that reported for CVD graphene, while the latter is considerably lower. The low mobility may be attributed to additional charge scattering in the QDs/Gr nanohybrids by polar molecules and other species adsorbed on graphene that may differ from sample to sample. As such, the carrier mobility of graphene in this Example likely actually represents the worst-case scenario and further improvement of the device performance may be achieved by removing the charge scattering mechanisms.

FIG. 5A shows a schematic of the HgTe QDs/Gr nanohybrid photodetector used for characterization of optoelectronic properties (the HgTe QDs synthesized using mercury acetate). FIG. 5B shows the schematic energy diagram and the charge transfer mechanism across the HgTe QDs/Gr interface. Upon light absorption by the HgTe QDs, electron-hole pairs or excitons are generated in photoactive HgTe QDs layer and dissociated at the interface by the built-in electric field. The built-in field also assists the transfer of photoexcited holes from the valance band of the HgTe QDs to graphene. The consequent photo-gating effect on graphene is demonstrated via the variation of graphene conductance as the photoresponse. FIG. 5C shows an optical image of a representative GFET array with 36 devices. Each device has the same channel width of 10 μm but different channel lengths of 2, 5, 10, and 20 μm, respectively. The right image is a zoom-in view showing a device having a finished channel dimension of 6.0 μm (length) and 12.8 μm (width).

Figures 5D, 5E, 5F, 5G:
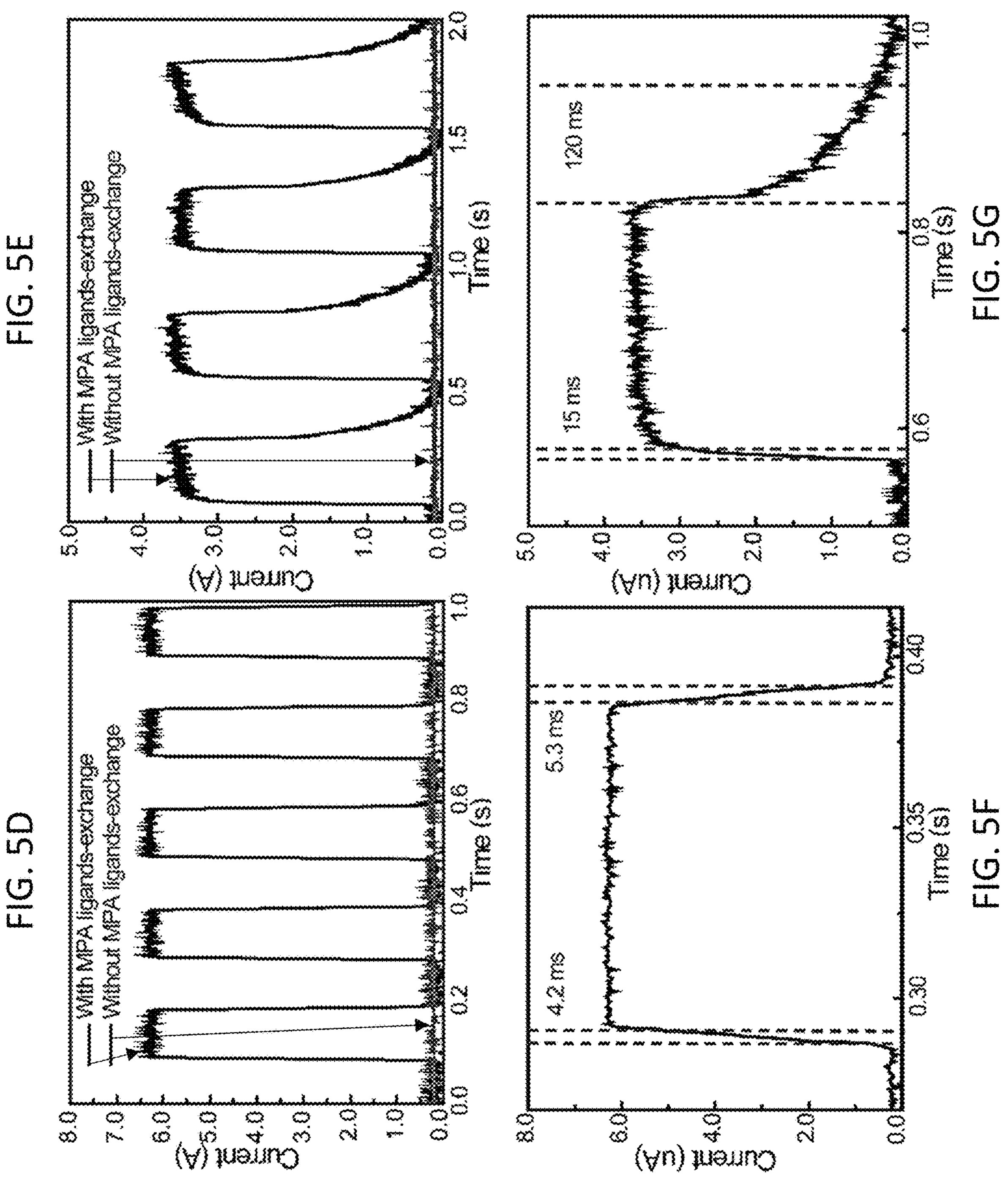
FIGS. 5D-5E plot dynamic photoresponse $I_{photo}$ curves from the HgTe QDs/Gr nanohybrid photodetector upon infrared illumination (2.25 μm and 3.25 μm, respectively) on/off with $V_{sd}$=0.5V.
FIGS. 5F-5G show the rise and fall time constants for the HgTe QDs/Gr photodetector under 2.25 μm (FIG. 5F) and 3.25 μm (FIG. 5G) wavelength illumination.

In addition to the bias voltage photoresponse, the HgTe QDs/graphene hybrid photodetector (synthesized using mercury acetate) exhibited excellent photoresponse reversibility. FIGS. 5D-5E show the on/off current under 2.25 μm and 3.25 μm illumination, respectively, before and after the MPA ligand exchange. Here, the photocurrent ($I_{photo}$) is defined as the difference between source-drain current under illumination and in dark ($I_{light}$ -$I_{dark}$), measured at a given bias voltage $V_{sd}$ between the source and drain electrodes. Before the MPA ligand exchange, the photoresponse was negligible under illumination at both wavelengths of 2.25 μm and 3.25 μm. In contrast, high and stable photoresponse was observed after the MPA ligand exchange, indicating the conductive MPA ligands play a critical role in establishing an effective charge transfer pathway between the HgTe QDs and graphene as well as between different HgTe QDs layers. FIGS. 5F-5G show the zoom-in view of the photoresponse from FIGS. 5D-5E, respectively, for one light on/off cycle. The rise (fall) time constant is defined as the time for the $I_{photo}$ to increase (decrease) from 10% to 90% (90% to 10%). At the 2.25 μm wavelength, the rise and fall time constants are 4.2 ms and 5.3 ms, respectively, increasing to 15 ms and 120 ms at the 3.25 μm wavelength. In fact, the time constants reported for existing QDs/Gr nanohybrids are typically in the range of tens to hundreds of milliseconds or longer due to the presence of charge traps at the QDs/Gr interface. Thus, the photoresponse of the present HgTe QDs/graphene nanohybrid photodetectors is excellent. Moreover, the faster response speed at shorter wavelengths may be attributed to the smaller trapping effect on charges with a higher kinetic energy excited by the higher energy wavelength photons as compared to the case of longer wavelengths. This result further suggests that an even higher response speed may be achieved by further reducing the charge trapping.

Figures 5H, 5I:
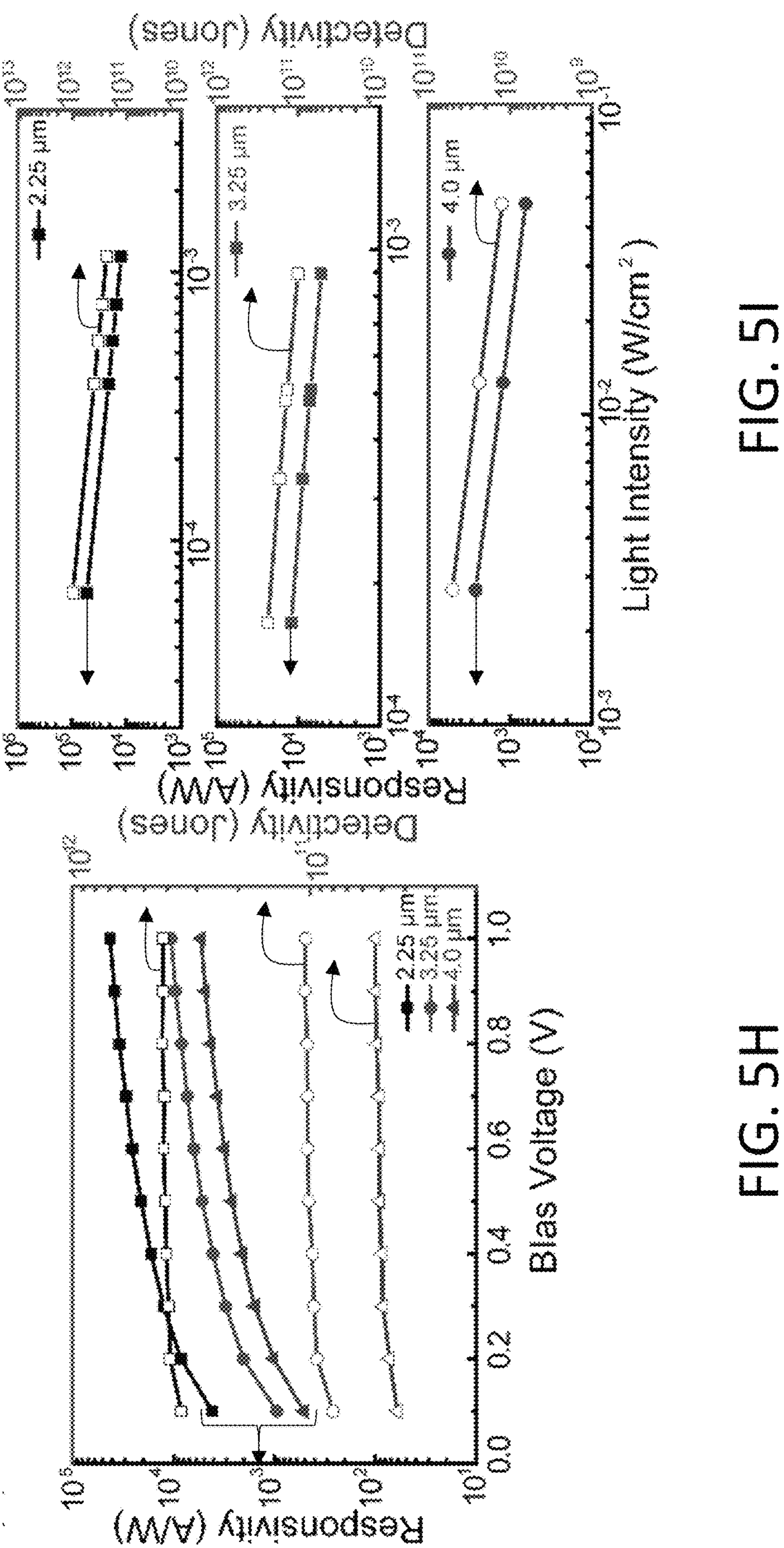
FIG. 5H plots R* (solid) and D* (open) a function of $V_{sd}$ taken on a representative HgTe QDs/Gr photodetector under the illumination of 2.25 μm ($P_{in}$~3.82×$10^{-4}$ W/cm$^2$), 3.25 μm ($P_{in}$~8.92×10−4 W/cm$^2$) and 4.0 μm ($P_{in}$~2.73×10−3 W/cm$^2$) wavelengths respectively.
FIG. 5I plots R* (solid) and D* (open) a function of $P_{in}$ for 2.25 μm, 3.25 μm and 4.0 μm wavelength illumination of a representative HgTe QDs/Gr photodetector at $V_{sd}$=0.5 V.

The responsivity R* is $I_{photo}/P_{in}$ where $P_{in}$ is the incident light power density irradiated on the active layer of the photodetector. R* is a critical parameter for evaluating the performance of a photodetector. FIG. 5H show the R* vs $V_{sd}$ curves of the HgTe QDs/Gr photodetectors under the wavelength of 2.25 μm, 3.25 μm, and 4.0 μm. At all three wavelengths, the R* increases linearly with $V_{sd}$. The maximum R* at $V_{sd}$=1.0 V is around $4.2\times10^4$ A/W under 2.25 μm wavelength ($P_{in}\sim3.8\times10^{-4}\ W/cm^2$), $1.1\times10^4$ A/W under 3.25 μm wavelength ($P_{in}\sim8.9\times10^{-4}\ W/cm^2$) and $5.4\times10^3$ A/W under 4.0 μm wavelength ($P_{in}\sim2.7\times10^{-3}\ W/cm^2$).

D* is another key figure of merit for a photodetector and can be calculated using the equation $D^*=(A\times\Delta f)^{1/2}/NEP$, where A is the active area of the device in $cm^2$, Δf is bandwidth in hertz, and NEP indicates the incident light power expected for the device output signal to be equal to the noise signal. NEP is expressed as $$NEP = \overline{I_n^2}^{1/2}/R^*,$$

where the $$\overline{I_n^2}$$

is the mean square noise current and can be calculated from the spectra density of the noise power. Using the device dimension shown in FIG. 5C (right), the active area of the HgTe QDs/Gr device can be estimated to be A=12.8×6.0 $\mu m^2=7.68\times10^{-7}\ cm^2$. Under the 3.25 μm illumination of $P_{in}=1.65\times10^4\ W/cm^2$, the R* is $\sim1.2\times10^4$ A/W from the measured $I_{photo}=1.55\times10^{-6}$ A under the bias voltage of 0.5 V. Using the mean square root noise current of $$\overline{I_n^2}^{1/2} = 4.52\times10^{-11}\,A/Hz^{1/2}$$

measured on this sample at the same frequency of 250 Hz as the chopper frequency used for R* measurement, the NEP and D* can be calculated using $$NEP = \overline{I_n^2}^{1/2}/R^* = 3.7\times10^{-15} W/Hz^{1/2}$$

and D*=$(A\times\Delta f)^{1/2}$/NEP=$2.4\times10^{11}$ Jones from the noise current density curves in FIG. 3D. The calculated D* for a HgTe QDs/Gr nanohybrid device is shown in FIG. 5H as function of $V_{sd}$ for 2.25 μm, 3.25 μm, and 4.0 μm wavelengths. It is noted that both noise amplitudes $$\langle \overline{I_n^2} \rangle$$

and R* increase linearly with $V_{sd}$. This means the D* should be constant at variable $V_{sd}$ values, which is consistent with the experimental observations shown in FIG. 5H. Specifically in the $V_{sd}$ range of 0.1 V to 1.0 V, the uncooled D* has a minimal variation and reaches $4.2\times10^{11}$ Jones at 2.25 μm wavelength ($P_{in}$~$3.82\times10^{-4}$ W/cm²), ~$1.1\times10^{11}$ Jones at 3.25 μm wavelength ($P_{in}$~$8.92\times10^{-4}$ W/cm²), and ~$5.3\times10^{10}$ Jones at 4.0 μm wavelength ($P_{in}$~$2.73\times10^{-3}$ W/cm²). FIG. 5I shows R* (solid) and D* (open) as a function of $P_{in}$ at the 2.25 μm, 3.25 μm, and 4.0 μm wavelengths ($V_{sd}$=0.5V). Overall, both R* and D* increase with decreasing $P_{in}$. Under 2.25 μm wavelength illumination, the highest uncooled R*

($5.3\times10^4$ A/W) and D* ($1.0\times10^{12}$ Jones) were obtained at the lowest $P_{in}$=$6.38\times10^{-5}$ W/cm². Under 3.25 μm wavelength illumination, the highest uncooled R* ($1.2\times10^4$ A/W) and D* ($2.4\times10^{11}$ Jones) were obtained at the lowest $P_{in}$=$1.65\times10^{-4}$ W/cm². Under 4.0 μm wavelength illumination, the highest uncool R* ($2.6\times10^3$ A/W) and D* ($5.1\times10^{10}$ Jones) were obtained at the lowest $P_{in}$=$2.73\times10^{-3}$ W/cm².

The high uncooled R* and D* obtained in the HgTe QDs/Gr nanohybrid photodetectors are remarkable, representing considerable progress as compared to existing QDs-based uncooled SWIR-MWIR detectors as shown in Table 1. In Table 1, the existing detectors made use of HgTe QDs synthesized using the $HgCl_2$ precursor (not the mercury acetate precursor used for the HgTe QDs of the present photodetectors). For example, the D* reported in this Example at 3.25 μm is about three orders of magnitude higher than that reported in a HgTe QDs/Gr photodetector (D* ~$10^8$ Jones at a wavelength of 2.5 μm and 80 K) in which the HgTe QDs were fabricated using the $HgCl_2$ precursor followed by ligand exchange with 1,2-ethanedithiol and other chemicals (compare entry 1 and entry 8 of Table 1, below.)

TABLE 1

HgTe QD-based SWIR-MWIR photodetector performance.

| Device | Reported Spectral Range | R* (A/W) | D* (Jones) | Temperature (K) | Response Time (s) | (Entry) and Reference |
|---|---|---|---|---|---|---|
| HgTe QDs/Gr | SWIR-MWIR (2.25-4 μm) | $5.32\times10^4$ | $1.03\times10^{12}$ (2.25 μm) | 295 K | $4.2\times10^{-3}$ | (1) This Example |
| | | $1.22\times10^4$ | $2.37\times10^{11}$ (3.25 μm) | 295 K | $1.5\times10^{-2}$ | |
| | | $2.64\times10^3$ | $5.13\times10^{10}$ (4 μm) | 295 K | | |
| HgTe* QD/$MoS_2$ | SWIR (2 μm) | $5\times10^3$ | $10^{12}$ (2 μm) | 295 K | $4\times10^{-3}$ | (2) Huo N., et al., *Adv. Mater.* 29, 1606576 (2017) |
| HgTe* QD | MWIR (~4.5 μm) | N/A | $1\times10^7$ (4.5 μm) | 295 K | $2.5\times10^{-6}$ | (3) Tang X., et al., *Nat. Photonics* 13, 277-282 (2019) |
| | | N/A | $3\times10^{10}$ (4.5 μm) | 85 K | | |
| HgTe* NC/Gr (vertical p-n junction) | SWIR (1.55 μm) | $6\times10^{-3}$ | $3\times10^9$ (1.55 μm) | 220 K | $10^{-6}$ | (4) Noumbe U. N., et al., *ACS Nano* 14, 4567-4576 (2020) |
| HgTe* NC/Gr (vertical p-n junction) | SWIR (1.55 μm) | $5\times10^{-5}$ | N/A | 220 K | <0.1 | (5) Gréboval C., et al., *Appl. Phys. Lett.* 117, (2020) |
| HgTe* NC/Gr | SWIR (2.5 μm) | $2\times10^{-3}$ | N/A | 250 K | $9\times10^{-9}$ | (6) Gréboval C., et al., *ACS Appl. Electron. Mater.* 3, 4681-4688 (2021) |
| HgTe* NC/Gr | SWIR (2.5 μm) | N/A | N/A | N/A | $6.8\times10^{-2}$ | (7) Tang X., et al. 2, 6701-6706 (2019) |
| HgTe* QDs/Gr | SWIR (up to 3 μm) | 900 | $6\times10^8$ (2.5 μm) | 80 K | N/A | (8) Grotevent M. J., et al., *Adv. Sci.* 8, 2003360 (2021) |
| HgTe* QD | MWIR (up to 4.5 μm) | 1.62 | $4\times10^{11}$ (4.5 μm) | 85 K | N/A | (9) Tang X., et al., *ACS Nano* 12, 7362-7370 (2018) |
| | | N/A | $10^{10}$ (4 μm) | 220 K | | |
| HgTe* QD | MWIR (up to 3.8 μm) | N/A | $10^9$ (600° C. blackbody source) | 230 K | N/A | (10) Ackerman M. M., et al., 7264-7271 (2018) |
| | MWIR (up to 4.8 μm) | 0.38 | $1.2\times10^{11}$ (600° C. blackbody source) | 85 K | $10^{-6}$ | |

TABLE 1-continued

| HgTe QD-based SWIR-MWIR photodetector performance. | | | | | | |
|---|---|---|---|---|---|---|
| Device | Reported Spectral Range | R* (A/W) | D* (Jones) | Temperature (K) | Response Time (s) | (Entry) and Reference |
| HgTe* NC | SWIR (1.55 μm) | $1.2 \times 10^{3}$ | $2 \times 10^{12}$ (1.55 μm) | 200 K | $2.2 \times 10^{-5}$ | (11) Chu A., et al., *Nat. Commun.* 12, 1794 (2021) |
| HgTe* QD | MWIR (600° C. blackbody source) | 0.23 | $5.4 \times 10^{10}$ (600° C. blackbody source) | 80 K | $10^{-6}$ | (12) Lan X., et al., *Nat. Mater.* 19, 323-329 (2020) |

QD = quantum dots, NC = nanocrystals, Gr = graphene, HgTe* = HgTe (NC or QD) synthesized using $HgCl_2$ precursor.

Figures 6G, 6H, 6I:
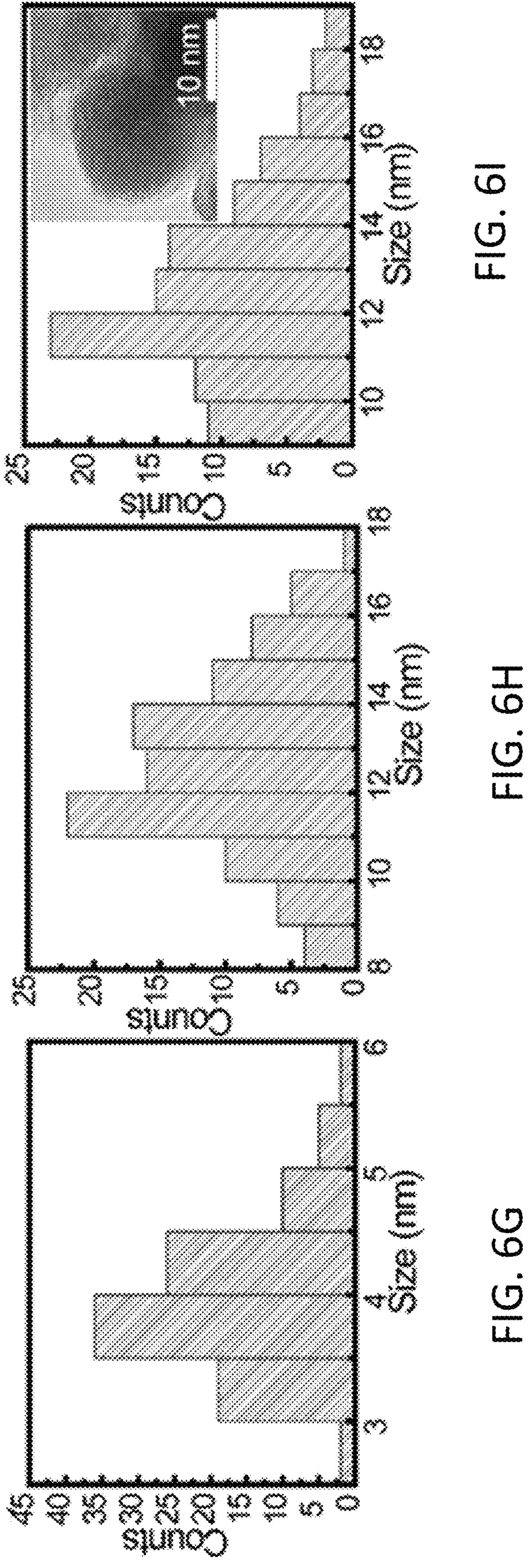
FIGS. 6G-6I show the corresponding size distributions with average sizes of 3.9 nm, 12.6 nm and 12.7 nm, respectively.

In order to understand the differences in HgTe QDs synthesized with the mercury acetate precursor (this Example) versus the $HgCl_2$ precursor, three kinds of colloidal HgTe QDs were synthesized to compare their effects on the uncooled MWIR detection in QDs/Gr nanohybrids. FIG. 6A shows a TEM image of HgTe QDs synthesized with the mercury acetate precursor (this Example). FIG. 6B shows a TEM image of HgTe (Cl) QDs synthesized with the $HgCl_2$ precursor. FIG. 6C shows a TEM image of core/shell HgTe QDs in which the HgTe core was synthesized using the $HgCl_2$ precursor while the HgTe shell was synthesized using the mercury acetate precursor. The synthesis of each type of HgTe QDs has been described in "Experimental" above. In all cases, MPA ligand exchange was used. Thus, synthesis of the HgTe (Cl) QDs/Gr nanohybrid photodetector corresponds to "Comparative Experiment A." FIGS. 6D-6F show the corresponding HRTEM images, illustrating the high crystallinity of all the QDs. FIGS. 6G-6I show the corresponding size distributions. Interestingly, QDs synthesized using the mercury acetate precursor (FIG. 6G) have distinctively different dimensions as compared to those synthesized using the $HgCl_2$ precursor (FIG. 6H). Specifically, the HgTe QDs synthesized with mercury acetate precursor are smaller having an average size in the range of 4-5 nm, even under various synthesis conditions (see Table 2). This is in contrast to the continuous size tunability from a few to few tens of nm for the HgTe (Cl) QDs synthesized with the $HgCl_2$ precursor under various synthesis conditions (see Table 2). This difference is indicative of different growth mechanisms for the two kinds of HgTe QDs.

TABLE 2

| HgTe QD size (nm) tunability as a function of reaction time and temperature. | | | | | | |
|---|---|---|---|---|---|---|
| HgTe QD average size (nm) using mercury acetate | | | | | | |
| Time (T = 90° C.) | 1 min (3.0) | 3 min (3.1) | 6 min (3.2) | 10 min (3.5) | 20 min (3.9) | 30 min (3.9) |
| Temperature (time = 30 min) | 70° C. (3.4) | 90° C. (3.9) | 120° C. (4.3) | | | |
| HgTe (CL) QD average size (nm) using $HgCl_2$ | | | | | | |
| Time (T = 120° C.) | 2 min (420) | 6 min (10.3) | 10 min (18.1) | 15 min (26.4) | | |
| Temperature (time = 10 min) | 100° C. (12.6) | 120° C. (18.1) | 120° C. (3.0) | 180° C. (34.9) | 220° C. (87.9) | |

In addition to differences in size, the HgTe QDs synthesized with mercury acetate versus $HgCl_2$ precursors have distinctively different morphologies. In contrast to the more rounded, spherical morphology of the HgTe QDs synthesized with mercury acetate (FIG. 6A), the HgTe (Cl) QDs synthesized with $HgCl_2$ have a non-spherical, triangular (or tetrahedral) shape indicative of growth facets on the surface thereof (FIG. 6B).

FIG. 6I shows the QD size distribution for the core/shell HgTe QDs. The average value of the core is 12.7 nm and the shell thickness is in the range of 1-2 nm. FIG. 6C shows that the QDs have a more rounded, spherical morphology. The inset of FIG. 6I shows a TEM image of an individual core/shell HgTe QD, showing no visible core/shell boundary or variation of the crystallinity across the radius of the QD. This, together with their comparable QD sizes, suggests that the core/shell HgTe QDs are comparable to HgTe (Cl) QDs synthesized using the $HgCl_2$ precursor except for a modification on the surface states during the shell growth using the mercury acetate precursor.

FIGS. 7A-7F illustrate two potential types of crystal growth mechanisms: grain-rotation-induced grain coalescence (GRIGC) for HgTe QDs synthesized using mercury acetate precursor (FIG. 7A) and Ostwald ripening (OR) for HgTe (Cl) QDs synthesized using $HgCl_2$ precursor (FIG. 7D). In the GRIGC mechanism, high-concentration, small-size particles form simultaneously and the collisions of the particles may stimulate orientation attachment between particles, leading to lower-energy configurations with coherent grain boundaries while rejecting a common grain boundary (a general planar defect that separates regions of different crystalline orientation, such as grains within a polycrystalline solid). This may lead to a nano-cluster structure as exhibited in FIG. 7A (coalescence process) instead of larger size QDs. In the OR mechanism, the free atoms from the precursor or dissolved small particles are transferred to the larger particles through attachment to the existing growth facets. This leads to continued QD growth to larger sizes, observed as described above and illustrated in FIG. 7D. Particles smaller than the average size shrink or even completely dissolve.

While different growth mechanisms can be ascribed to the different HgTe QDs synthesized using different precursor chemistries, the HgTe QDs also exhibit distinctively different surface states as shown in FIGS. 7B-7C for the HgTe QDs synthesized using the mercury acetate precursor and FIGS. 7E-7F for HgTe (Cl) QDs synthesized using the $HgCl_2$ precursor. Specifically, FIGS. 7B and 7E show HRTEM images for each kind of QD and FIGS. 7C and 7F show zoom-in views from the HRTEM images on the edges (or surfaces) of the QDs. The lines in FIG. 7E correspond to such edges. Notably, the Hg and Te atoms are clearly visible on the surface of the HgTe QDs synthesized using mercury acetate (FIG. 7C). This is in contrast to the HgTe (Cl) QDs synthesized using $HgCl_2$ (FIG. 7F) in which only Hg atoms are visible on the surface and Te atoms are hidden in between the Hg atoms due to the depth and "Z" contrast in the HRTEM. As a result, the HgTe QDs synthesized using the mercury acetate precursor have nearly stoichiometric surface states while the HgTe (Cl) QDs synthesized using $HgCl_2$ have non-stoichiometric surface states. In the HgTe QDs synthesized using the mercury acetate precursor, there may be a minor Te deficiency as revealed by the n-doping of graphene evidenced in the Raman and GFET studies shown in FIGS. 2B and 4B, respectively. In fact, for II-VI semiconductor nanocrystals with zinc blende crystal structure, such as HgTe QDs here, the main source of surface states or charge traps is apparently related to dis-coordinated chalcogenide atoms on the QD surface.

Interestingly, as shown in FIGS. 7G-7H, the core/shell HgTe QDs have both Hg and Te atoms visible on the QD surface. The atomic radii for Hg and Te are within 6% of the theoretical values on all three kinds of HgTe QDs. The d-spacing values for HgTe and core/shell HgTe QDs, i.e. $d_{(011)}$=0.4 nm and $d_{(011)}$=0.45 nm, are approximately 5% smaller than the theoretical values. In the case of the HgTe (Cl) QDs synthesized using $HgCl_2$, $d_{(1000)}$=0.34 nm, which is 6% larger than the theoretical value. Note the HgTe QDs synthesized using the mercury acetate precursor and core/shell HgTe QDs have the same zone axis [011], while the HgTe (Cl) QDs synthesized using the $HgCl_2$ precursor is oriented along the [100]. This further confirms the different atomic frameworks and surface states described above for the three kinds of HgTe QDs.

Figures 7J, 7K:
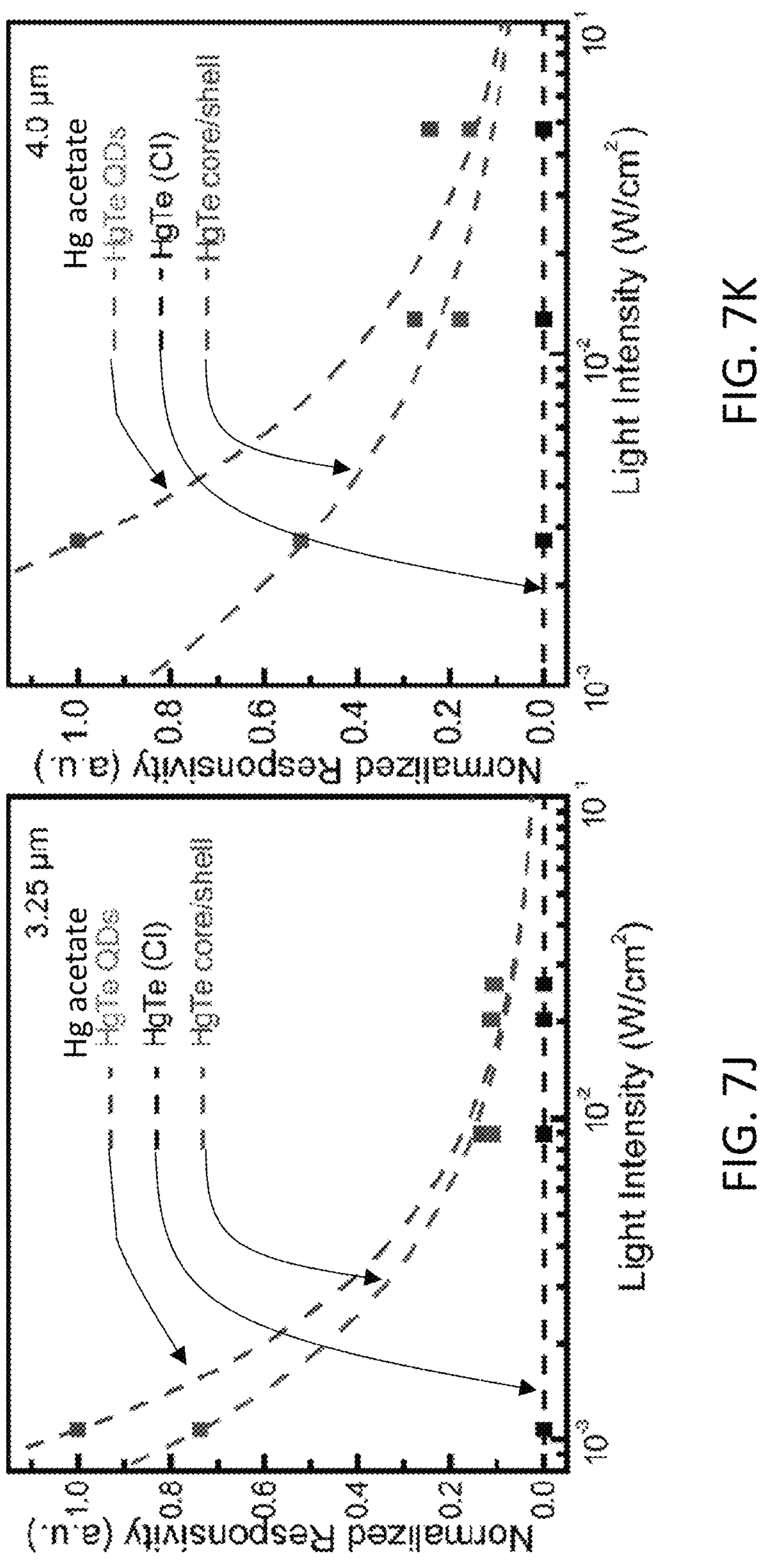
FIGS. 7J-7K compare normalized R* measured on the three kinds of HgTe QDs/Gr nanohybrid photodetectors at 3.25 μm and 4.0 μm wavelengths respectively. Note that MPA ligand exchange was used for all three kinds of HgTe QDs/Gr nanohybrid photodetectors.

The differences revealed between the three kinds of HgTe QDs dramatically impact the MWIR photodetection performance of the HgTe QDs/Gr nanohybrid photodetectors made therefrom. FIGS. 7J-7K compare the normalized R* at 3.25 μm (FIG. 7J) and 4.0 μm (FIG. 7K) wavelengths for each HgTe QDs/Gr nanohybrid photodetector incorporating a different kind of HgTe QDs. To facilitate the comparison, the R* for all samples is normalized to the highest value measured for the HgTe QDs/Gr nanohybrid device at the lowest light intensities ($1.08\times10^{-3}$ W/cm$^2$ and $2.73\times10^{-3}$ W/cm$^2$ for 3.25 μm and 4.0 μm wavelengths, respectively). The HgTe QDs/Gr nanohybrid photodetector incorporating the HgTe QDs synthesized using the mercury acetate precursor exhibited the highest R* values among the three kinds of QDs/Gr samples. In contrast, the HgTe QDs/Gr nanohybrid photodetector incorporating the HgTe (Cl) QDs synthesized using the $HgCl_2$ precursor exhibited negligible photoresponse, another indication of defective surface states (missing Te atoms on the HgTe (Cl) QD surface) that serve as severe charge traps reducing both R* and response speed. Interestingly, the core/shell HgTe QDs/Gr nanohybrid photodetector exhibited comparable, although slightly lower, R* at both wavelengths. It is noted that the core/shell HgTe QD differs from HgTe (Cl) QDs primarily in its surface states as described above. FIGS. 7J-7K show that this difference in surface states has a huge effect on photodetector performance. The slightly lower R* for the core/shell HgTe QDs/Gr as compared to the non-core/shell HgTe QDs/Gr may be attributed to an incomplete QD surface passivation during the shell growth.

In addition to HgTe QD surface states, graphene also plays a critical role in achieving high uncooled SWIR-MWIR R* and D* of the HgTe QDs/Gr nanohybrids. In order to shed light on the role of graphene in the HgTe QDs/Gr nanohybrids for MWIR detection, comparative samples made with the same colloidal HgTe QDs (synthesized using mercury acetate (no $HgCl_2$) without graphene were fabricated and characterized. The dynamic photoresponse (not shown) for the comparative devices was otherwise the same as the HgTe QDs/Gr nanohybrids except the graphene is absent in the former. This means the HgTe QDs are responsible for MWIR light absorption in both cases since the monolayer graphene absorbs only 2.3% of the incident light in a broadband spectrum from ultraviolet to sub-THz. Therefore, the major difference of the two kinds of devices relates to the charge transport paths. Without graphene, the exciton dissociation and the charge transport occur in the HgTe QD films as driven by the source-drain bias voltage. In contrast, the excitons dissociate at the QDs/Gr interface with assistance of the built-in electric field at the interface followed with hole transfer from HgTe QDs to graphene. The charge transport hence occurs in graphene in the HgTe QDs/Gr nanohybrids. The higher charge mobility of graphene (by orders of magnitude) as compared to the HgTe QD films significantly reduces charge recombination in the HgTe QDs/Gr nanohybrid photodetectors. The difference in the charge transport mechanism leads to a significant difference of the MWIR R* for the two kinds of devices. In the comparative sample without graphene, R* is negligible under 3.25 μm illumination (data not shown). In contrast, the HgTe QDs/Gr nanohybrid photodetector exhibits R* of $2.4\times10^4$ A/W at $V_{sd}$=0.5 V and light intensity of 0.085 W/cm$^2$ (data not shown). Even if the carrier mobility of the HgTe QD films could be improved moderately through QD surface modifications, achieving uncooled MWIR R* and D* competitive to that of cooled conventional semiconductor IR detectors is unlikely since the HgTe QD films rely on the same detection physics as in the conventional semiconductors and hence the same dark-current limitation applies. Thus, graphene is critical to the improved performance of the present HgTe QDs/Gr nanohybrid photodetectors.

Figures 8A, 8B:
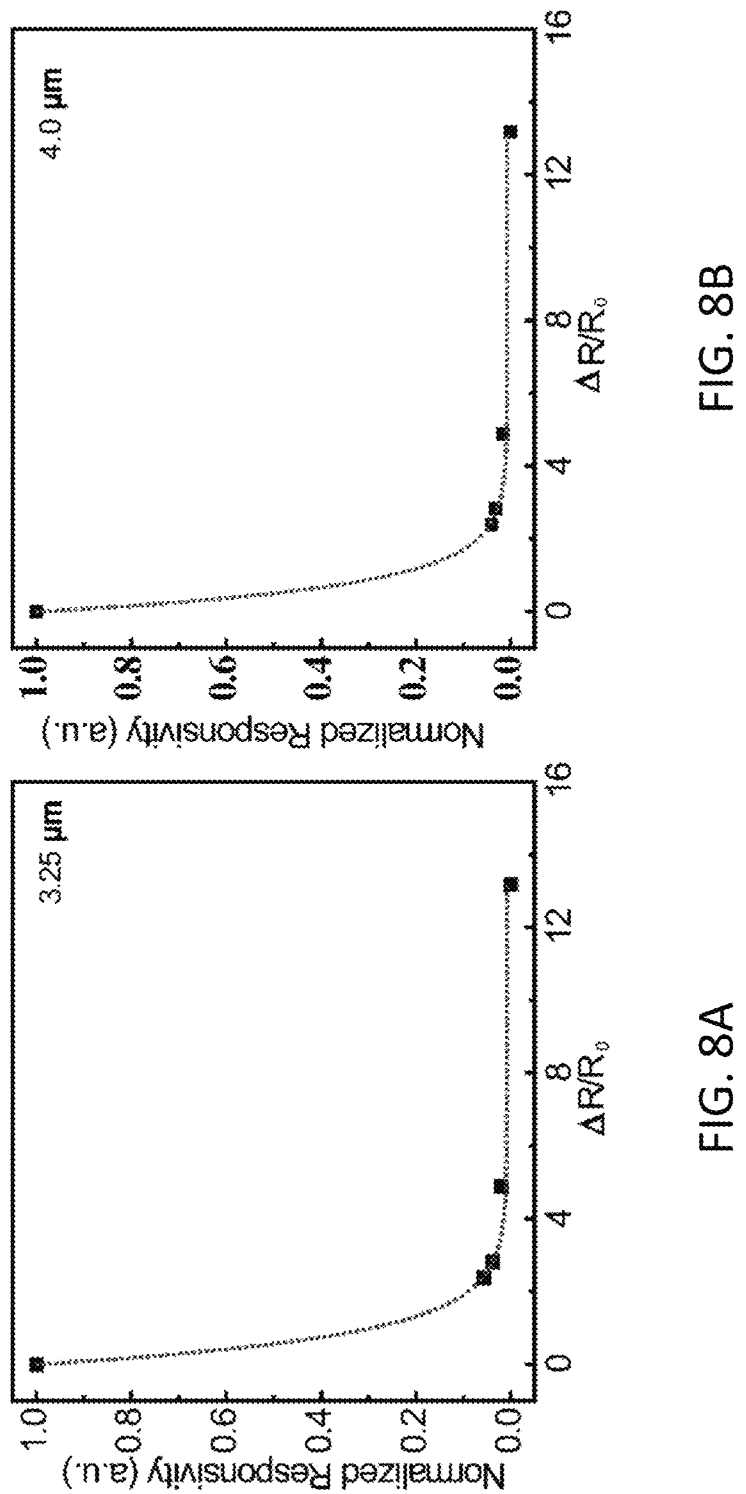
FIG. 8A shows the normalized responsivity of HgTe QDs/Gr nanohybrid photodetectors as a function of graphene's resistance change normalized to its original resistance after HgTe QDs deposition at 3.25 μm and in FIG. 8B, at 4.0 μm.
Figures 8C, 8D:
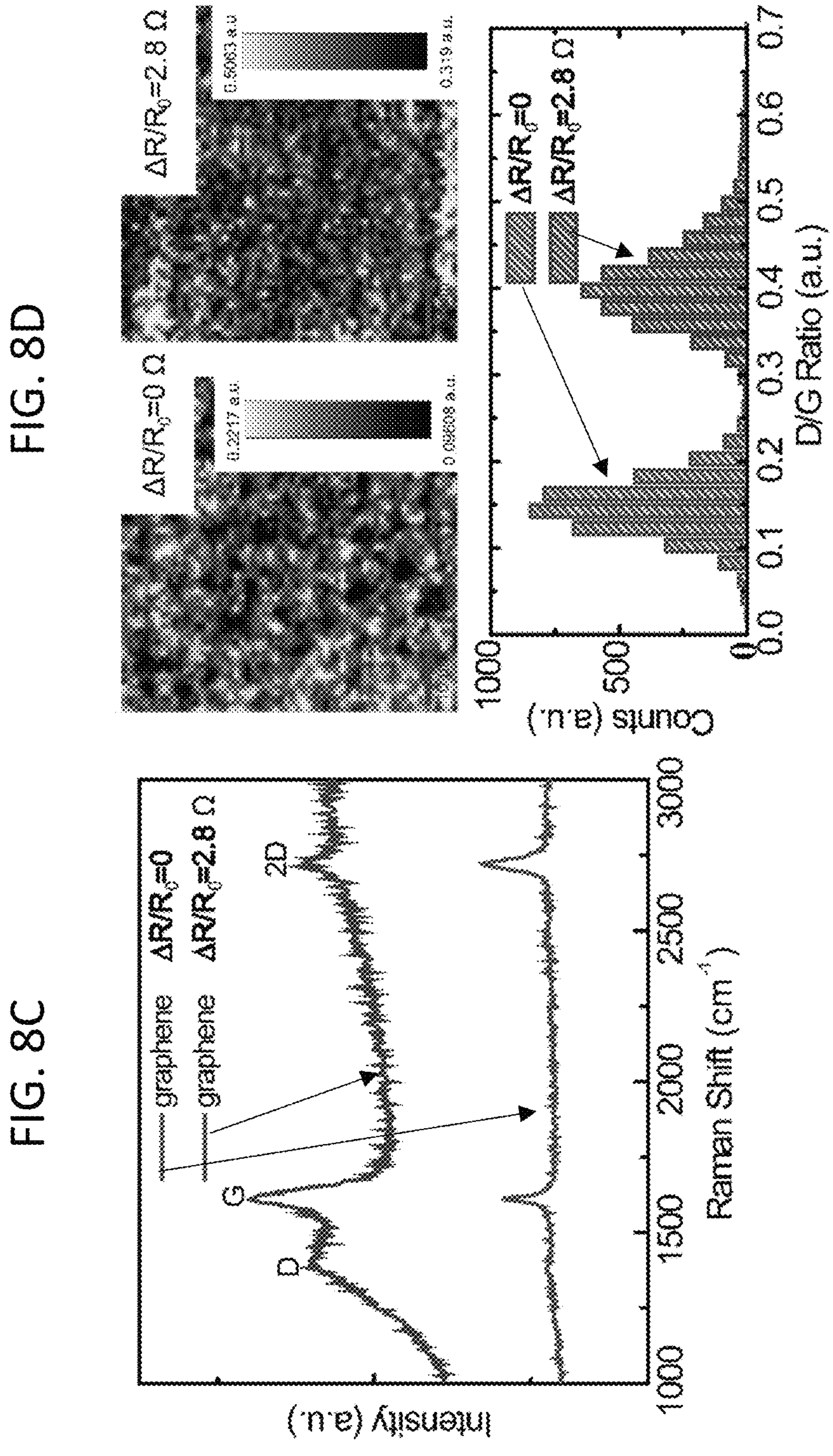
FIG. 8C compares Raman spectra of samples with graphene having 0 and 2.8 times relative resistance change after QD deposition.
FIG. 8D compares the graphene D/G ratio from a Raman map on a 60 μm×60 μm area of the sample (top) and the D/G ratio histograms (bottom) taken on the graphene that have 0 and 2.8 times relative resistance change after QD deposition respectively.

Furthermore, the quality of the graphene, which could be degraded during the device fabrication, has been found to affect the optoelectronic sensitivity of the present HgTe QDs/Gr nanohybrid photodetectors. FIGS. 8A-8B plot the normalized R* measured at 3.25 μm and 4.0 μm wavelengths, respectively, on a set of HgTe QDs/Gr nanohybrid photodetectors as function of graphene channel resistance (R) change after the completion of the device fabrication process. Typically, an increase of the graphene channel resistance was observed among ~30 devices investigated in this Example. The lower end of the graphene channel resistance increase was on the order of 70-100% of the original graphene channel resistance ($R_0$) before HgTe QD deposition. This change may be attributed to the reduced charge doping by HgTe QD deposition as explained in FIGS. 3A-3D and 4A-4D. However, on some samples, larger channel resistance increases were observed when the device fabrication process (including MPA ligand exchange) was not performed within an optimal window. A monotonic decreasing trend of R* with the increasing $\Delta R = R - 2R_0$ is shown in FIGS. 8A-8B. The Raman spectra taken on two HgTe QDs/Gr samples on transparent fused Silica substrates (to allow Raman data to be taken from the back of the substrate) are shown in FIG. 8C. The sample with $\Delta R/R_0 = 2.8$ shows a significant defect D peak of graphene in contrast to a negligible D peak in the sample with $\Delta R \sim 0$. This indicates a large resistance increase beyond $2R_0$ may stem from damages on graphene channel during device fabrication. FIG. 8D compares the Raman D/G peak ratio maps (top) and histograms (bottom) of these two samples. The average D/G ratio increases from 0.15 for the samples with $\Delta R = 0$ to 0.4 for the sample with $\Delta R/R_0 = 2.8$. The damage of the graphene channel can lead to a significant decrease of the R* in MWIR spectrum. For example, the R* of the sample with $\Delta R/R_0 = 2.8$ is only 3.91% and 3.12% of the R* for the sample with $\Delta R = 0$ at 3.25 μm (FIG. 8A) and 4.0 μm wavelength (FIG. 8B) respectively.

In order to evaluate the robustness of the HgTe QDs stoichiometry on the performance, especially the stability of HgTe QDs/Gr nanohybrid photodetectors, the Hg:Te molar ratio was varied from 2:1 to 1:2 using mercury acetate as the precursor source. TEM images and size distribution plots (data not shown) were obtained. All of the HgTe QDs exhibited similar rounded, spherical morphology, illustrating that the morphology of HgTe QDs is independent of the precursor molar ratio. Furthermore, the diameter of the HgTe QDs ranged from 3-5 nm and did not vary significantly when the precursor ratio was varied from Hg:Te 2:1 to 1:2. The optical absorption spectra of HgTe QDs synthesized at different Hg:Te ratios were also obtained (data not shown). All of the HgTe QDs exhibited broadband absorption from NIR to MWIR. This result suggests that the Hg:Te stoichiometry is only moderately affected by the Hg:Te precursor ratio. However, unreacted $Hg^{2+}$ ions can, to some extent, passivate the QD surface defects and improve the photon-to-electron conversion efficiency and charge transfer efficiency via reduced charge trapping. The noise spectra of graphene before and after the deposition of the HgTe QDs synthesized at different Hg:Te precursor ratios all show reduced noise amplitude after the QDs deposition (data not shown), indicating the surface charge type (minor Te deficiency) that causes n-doping is similar. The drop in the graphene noise amplitude after HgTe QDs deposition shown in FIG. 3B was greater than that obtained in these additional measurements. This is a result of the initial condition of graphene, which can differ from sample to sample. Since the HgTe QDs reduce the unintended charge doping from adsorbed polar molecules as described above, the noise drop after the HgTe QD deposition would be larger if the initial unintended doping was larger. This is consistent with the comparable noise current densities in the HgTe QDs/Gr nanohybrids shown in FIG. 3D and the additional measurements at a comparable $V_{sd}$. Specifically, the noise current density dropped to $\sim 2\times10^{-10}$ A/√Hz (at $V_{sd}=0.1$ V) after HgTe QDs deposition among more than ~30 HgTe QDs/Gr nanohybrid devices tested in this Example, regardless of the initial condition of the graphene.

The MPA ligand-exchange process on a QD is schematically illustrated in FIGS. 9A-9C. As shown in FIG. 9A, OLA, trioctylphosphine (TOP), and 1-dodecanethiol (DDT) ligands are the main capping ligands of the HgTe QDs as-synthesized as described above and play a protective and stabilizing role in the organic storage reagent. In addition, the TOP and DDT ligands compensate for the weak interactions of OLA and improve the stability of the colloidal HgTe QDs against degradation in ambient. In the QD synthesis process, OLA acts both as a stabilizer and a reducing agent. However, the OLA also acts as an insulating layer on QDs, blocking the charge transfer process in optoelectronic devices. As illustrated in FIGS. 9B and 9C, the OLA ligands capping the HgTe QDs surface can be readily replaced by short-chain and more conductive MPA ligands to create a charge transfer path from QDs to graphene. When the OLA, TOP and DDT ligands are substituted by MPA ligands, the strong interaction between the negative $HS^-$ group in MPA and the positively polarized $Hg^{2+}$ terminating group on the HgTe QD surface can lead to strong bonding of the MPA ligands to the HgTe QDs surface. This provides multiple benefits including (1) reduced charge trapping by the surface defects of the HgTe QDs, (2) highly efficient charge transfer between QDs and between QDs to graphene through highly conductive MPA short ligands, and (3) enhanced ambient stability of the HgTe QDs and the hence HgTe QDs/Gr nanohybrid devices.

Figures 9G, 9H:
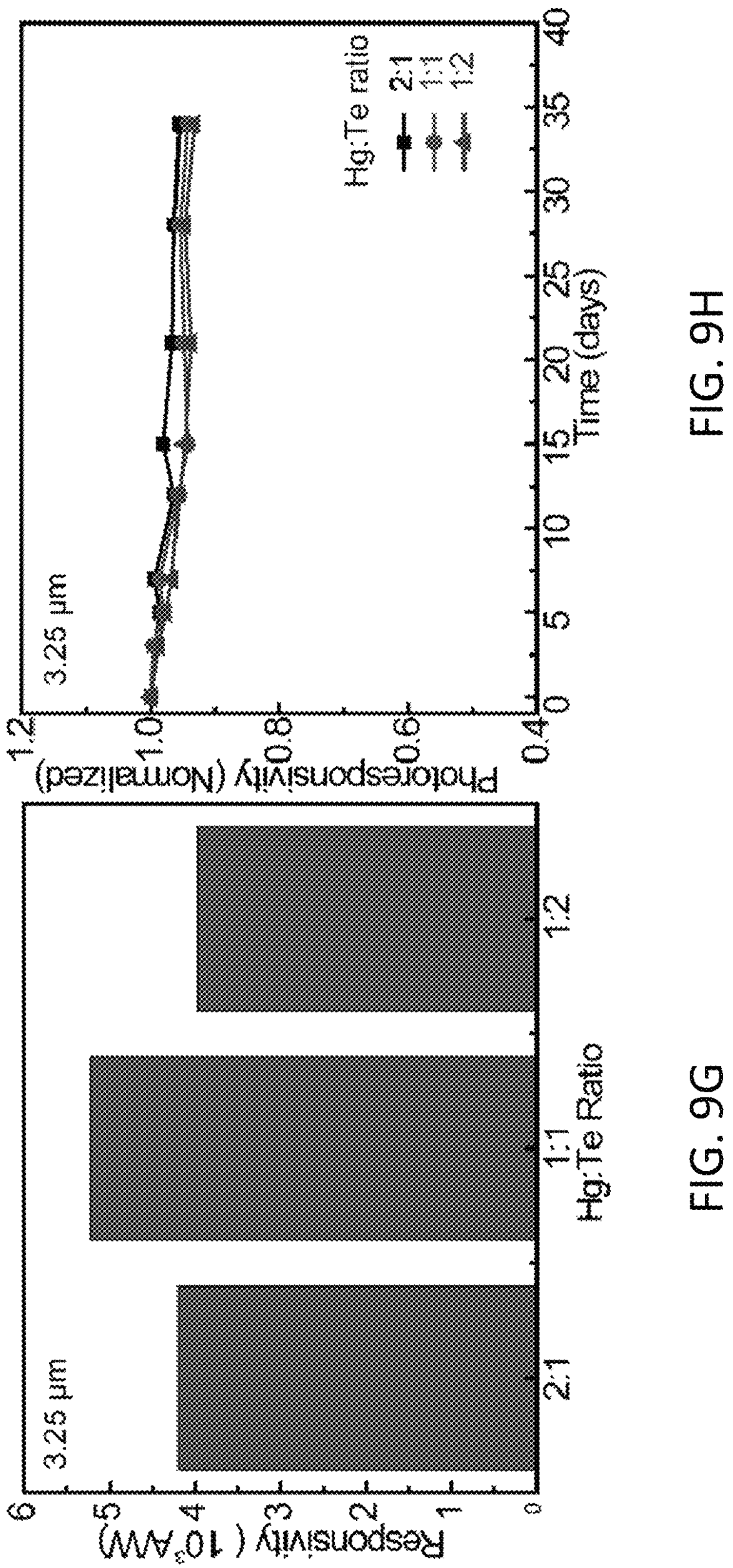
FIG. 9G shows HgTe QDs/Gr nanohybrid photodetector performance with Hg:Te precursor molar ratios of 2:1, 1:1, and 1:2 under 3.25 μm wavelength incident light at $P_{in}$~8.9×$10^{-4}$ W/cm$^2$ and $V_{sd}$=0.5 V.
FIG. 9H plots the normalized R* of the three HgTe QDs/Gr nanohybrid photodetectors in FIG. 9G as measured over a period of 30 days.

The MPA ligand-exchange process on a HgTe QDs/Gr nanohybrid photodetector is illustrated in FIGS. 9D-9F. After deposition of the HgTe QDs, the exposed charged HgTe QDs at the QDs/Gr interface (due to removal of the capping ligands such as OLA) induce n-doping to the graphene as suggested by noise reduction, resistance increase, and Fermi energy shift towards less p-doping. As the OLA capping ligands may only be removed at the HgTe QDs/Gr interface, the doping may not be affected by the follow-up MPA ligand exchange, leading to no further shift of the noise amplitude and Fermi energy after the deposition of the first layer HgTe QDs. This is consistent with the experimental observations in FIGS. 3B and 4B. As shown in FIG. 9F, the MPA ligands at the HgTe QDs/Gr interface may form an electrically conductive bridge for charge transfer between HgTe QDs and graphene and inter-HgTe QDs connections. This bridge may play a critical role in obtaining high R* and D* as well as high response speed as confirmed in FIGS. 5D-5I. In addition, the MPA ligand exchange seems to accommodate the variation of the surface states when using different Hg:Te molar ratios. For example, as shown in FIG. 9G, the R* of the HgTe QDs/Gr nanohybrid devices at three different Hg:Te molar ratios are fairly comparable under 3.25 μm wavelength incident light. At $P_{in}\sim 8.9\times10^{-4}$ W/cm$^2$ and $V_{sd}=0.5$ V, the highest R* of $5.2\times10^3$ A/W was achieved for the device at the Hg:Te=1:1 precursor molar ratio. The lowest R* of $4.0\times10^3$ A/W was achieved for the device at the Hg:Te=1:2 precursor molar ratio. Finally, the MPA ligands can passivate the HgTe QD surface against ambient exposure to enhance stability of the HgTe QDs/Gr nanohybrid devices. Stability is another important benchmark for applicability of QDs-based photodetectors because the large surface-to-volume ratio in nanoscale QDs is prone to ambient degradation. FIG. 9H illustrates the high stability of the three HgTe QDs/Gr nanohybrid photodetectors synthesized at different Hg:Te precursor molar ratios. With MPA ligand exchange, the HgTe QDs/Gr photodetectors exhibited in air stability after more than 30 days with less than 5% degradation in uncooled R* at the 3.25 μm wavelength.

CONCLUSION

This Example describing a study of the noise and optoelectronic properties of HgTe QDs/Gr nanohybrids has revealed several important insights on the physics relevant to these quantum sensors for SWIR-MWIR photodetection at room temperature. First, the noise in the QDs/Gr nanohybrids is dominated by the noise from graphene with negligible contributions from HgTe QDs in dark and under illumination. This means the noise origin in the QDs/Gr nanohybrids differs fundamentally from that of the conventional semiconductor counterparts for IR detection. In particular, it is not sensitive to the thermal noise that degrades signal-to-noise ratio in semiconductors of small bandgaps and limits the performance of uncooled conventional IR detectors at SWIR-MWIR or longer wavelengths.

Secondly, the QDs may be engineered to reduce the noise in the QDs/Gr nanohybrids by reducing or eliminating the unintended charge carrier doping of graphene by the adsorbed polar molecules and surface species. Specifically, this Example has shown that the HgTe QDs synthesized with a mercury acetate precursor can reduce the noise of the HgTe QDs/Gr nanohybrids by up to an order of magnitude via HgTe QD-induced n-doping of the originally p-doped graphene. This also shows that graphene noise may be further reduced towards its intrinsic limit by eliminating the unintended charge doping common in practical graphene-based devices fabricated using solution processes and operating in ambient conditions.

Thirdly, the surface states of HgTe QDs were found to be critical to MWIR detection at room temperature and linked to the QD growth mechanisms. Through a comparative study of the HgTe QDs/Gr nanohybrid photodetectors with three kinds of HgTe QDs (HgTe QDs synthesized with mercury acetate precursor via GRIGC mechanism, HgTe (Cl) QDs synthesized with $HgCl_2$ precursor via OR mechanism, and core/shell HgTe QDs with the HgTe core grown via OR and shell via GRIGC), the uncooled MWIR R* and D* were found to correlate directly with Te deficiency on these HgTe QDs. High Te deficiency was observed on the surface of the HgTe (Cl) QDs; the negligible MWIR R* and D* for the HgTe (Cl) QDs/Gr nanohybrid photodetectors suggests that such defective surface states may pose a severe charge trapping effect and prevent MWIR detection. In contrast, approximately stoichiometric surface states were observed for HgTe QDs and core/shell HgTe QDs. In both cases, high MWIR R* and D* were obtained.

Fourthly, the MWIR R* and D* are strongly affected by the graphene quality, as evaluated by the channel resistance change defined as $\Delta R=R-2R_0$ in combination with Raman spectroscopy. A moderate change of $\Delta R/R_0 \sim 2.8$ was found to decrease the MWIR R* to only ~3-4% of that for samples showing $\Delta R \sim 0$.

Finally, the results further show the importance of an efficient charge transfer pathway across the QDs/Gr interface for high photoresponsivity and high response speed. This is accomplished by using MPA ligand exchange to facilitate the charge transfer across the HgTe QDs/Gr interface. Uncooled R* up to $5.3\times10^4$ A/W at 2.25 μm, $1.2\times10^4$ A/W at 3.25 μm, and $2.6\times10^3$ A/W at 4.0 μm wavelengths, respectively, has been achieved at $V_{sd}$=0.5 V. This leads to a D* of up to $1.0\times10^{12}$ Jones, $2.4\times10^{11}$ Jones, and $5.1\times10^{10}$ Jones respectively, at 2.25 μm, 3.25 μm, and 4.0 μm wavelengths at room temperature. Furthermore, the MPA ligand exchange is able to passivate the surface states of HgTe QDs as demonstrated in the comparable R* values and its stability in ambient for the HgTe QDs/Gr nanohybrid devices.

Table 3, below, summarizes some of the results already described above along with results from other of the comparative experiments described in "Experimental" above. The results further demonstrate the superiority of the present HgTe QDs/graphene hybrid photodetectors, including the importance of the mercury acetate precursor and the MPA ligand exchange.

TABLE 3

Responsivity Results.

| Experiment | Mercury Precursor/ Ligand Exchange | Responsivity R* A/W (3250 nm, 0.89 mW/cm², 0.5 V) |
|---|---|---|
| Present disclosure | Mercury acetate/MPA[a] | $5.21\times10^3$ |
| Present disclosure | Mercury chloride (core, Hg:Te 1:1) Mercury acetate (shell Hg:Te 1:1)/MPA[b] | $2.6\times10^3$ |
| Comparative Experiment A | Mercury chloride/MPA[a] | 0 (no response) |
| Comparative Experiment B | Mercury chloride/EDT/HCl/IPA[a] | $1.1\times10^3$ |
| Comparative Experiment C1 | Mercury acetate/EDT/HCl/IPA[a] | 0 (no response) |
| Comparative Experiment C2 | Mercury chloride (core) Mercury acetate (shell)/EDT/HCl/IPA[b] | $2.06\times10^3$ |
| Comparative Experiment C3 | Mercury acetate/MPS/$H_2O$/IPA[a] | 0 (no response) |
| Comparative Experiment C4 | Mercury acetate/EDT/HCl/acetonitrile[a] | 0 (no response) |

[a]Non-core shell HgTe QDs
[b]Core-shell HgTe QDs (Hg:Te = 1:1 in core and shell)

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of fabricating a photodetector, the method comprising:

(a) combining a mercury acetate precursor with a chalcogen precursor in a solution comprising stabilizing ligands under conditions to form mercury chalcogenide quantum dots;

(b) depositing the mercury chalcogenide quantum dots on a surface of graphene; and (c) exchanging stabilizing ligands on surfaces of the mercury chalcogenide quantum dots with 3-mercapto-propionic acid.

2. The method of claim 1, further comprising combining an additional mercury precursor with the chalcogen precursor in the solution comprising stabilizing ligands under conditions to form mercury chalcogenide core particles, wherein step (a) provides a mercury chalcogenide shell layer over each mercury chalcogenide core particle to provide core-shell mercury chalcogenide quantum dots.

3. The method of claim 2, wherein the additional mercury precursor is a mercury halide precursor.

4. The method of claim 3, wherein the mercury halide precursor is mercury chloride.

5. The method of claim 1, wherein step (c) is carried out after step (b).

6. The method of claim 1, wherein the chalcogen precursor is tellurium.

7. The method of claim 1, wherein the mercury chalcogenide quantum dots are HgTe quantum dots.

8. The method of claim 1, wherein the stabilizing ligands comprise oleylamine and one or both of trioctylphosphine and dodecanethiol.

9. The method of claim 1, wherein the mercury chalcogenide quantum dots are HgTe quantum dots and the stabilizing ligands comprise oleylamine and one or both of trioctylphosphine and dodecanethiol.

10. The method of claim 1, wherein the mercury chalcogenide quantum dots are spherical in shape.

11. The method of claim 1, wherein both mercury atoms and chalcogen atoms are present at surfaces of the mercury chalcogenide quantum dots at a 1:1 surface stoichiometry.

12. The method of claim 1, wherein the mercury chalcogenide quantum dots consist of HgTe quantum dots and the stabilizing ligands consist of oleylamine and one or both of trioctylphosphine and dodecanethiol.

13. The method of claim 1, wherein the photodetector is characterized by responsivity R* of at least $10^4$ A/W and a detectivity D* of at least $10^{11}$ Jones at a wavelength of 2.25 mm, an intensity of 0.6 mW/cm$^2$, a bias voltage of 0.5 V, and room temperature.

* * * * *